(12) United States Patent
Li et al.

(10) Patent No.: US 11,551,090 B2
(45) Date of Patent: Jan. 10, 2023

(54) SYSTEM AND METHOD FOR COMPRESSING IMAGES FOR REMOTE PROCESSING

(71) Applicant: ALIBABA GROUP HOLDING LIMITED, Grand Cayman (KY)

(72) Inventors: Sicheng Li, San Mateo, CA (US); Zihao Liu, San Mateo, CA (US); Yen-Kuang Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 315 days.

(21) Appl. No.: 17/005,981

(22) Filed: Aug. 28, 2020

(65) Prior Publication Data
US 2022/0067507 A1    Mar. 3, 2022

(51) Int. Cl.
*G06N 3/08* (2006.01)
*G06N 3/04* (2006.01)
*G06K 9/62* (2022.01)
*G06V 10/20* (2022.01)

(52) U.S. Cl.
CPC ............. *G06N 3/08* (2013.01); *G06K 9/6256* (2013.01); *G06K 9/6262* (2013.01); *G06N 3/0454* (2013.01); *G06V 10/20* (2022.01)

(58) Field of Classification Search
CPC ...... G06N 3/08; G06N 3/0454; G06K 9/6256; G06K 9/6262; G06V 10/20
USPC ..................................................... 382/156
See application file for complete search history.

(56) References Cited

U.S. PATENT DOCUMENTS

| | | | | |
|---|---|---|---|---|
| 2018/0174047 A1* | 6/2018 | Bourdev | ............... | G06N 20/00 |
| 2019/0373264 A1* | 12/2019 | Chong | ..................... | G06N 3/02 |
| 2020/0293876 A1* | 9/2020 | Phan | ...................... | G06N 3/084 |
| 2021/0004677 A1* | 1/2021 | Menick | .................... | G06N 3/08 |
| 2021/0201157 A1* | 7/2021 | Jiang | ....................... | H03M 7/70 |
| 2021/0281867 A1* | 9/2021 | Golinski | ............. | H04N 19/172 |

OTHER PUBLICATIONS

Cheng et al. "Learning Image and Video Compression through Spatial-Temporal Energy Compaction," Proceedings of the IEEE Conference on Computer Vision and Pattern Recognition, pp. 10071-10080 (2019).

Isensee et al. "nnU-Net: Breaking the Spell on Successful Medical Image Segmentation," arXiv preprint, arXiv: 1904.08128, 9 pages (2019).

Lee et al., "Context-Adaptive Entropy Model for End-To End Optimized Image Compression," arXiv preprint, arXiv: 1809.10452, 20 pages (2018).

(Continued)

*Primary Examiner* — Juan A Torres
(74) *Attorney, Agent, or Firm* — Finnegan, Henderson, Farabow, Garrett & Dunner, LLP

(57) ABSTRACT

The present disclosure relates to a system and method for image processing. In some embodiments, an exemplary image processing method includes: receiving an image; compressing, with a compression neural network, the image into a compressed representation; and performing, with a processing neural network, a machine learning task on the compressed representation to generate a learning result. The compression neural network and the processing neural network are jointly trained.

20 Claims, 15 Drawing Sheets

(56) References Cited

OTHER PUBLICATIONS

Liu et al., "Machine Vision Guided 3D Medical Image Compression for Efficient Transmission and Accurate Segmentation in the Clouds," Conference on Computer Vision and Pattern Recognition, pp. 12687-12696 (2019).
Minnen et al. "Joint Autoregressive and Hierarchical Priors for Learned Image Compression," Advances in Neural Information Processing Systems, pp. 10771-10780 (2018).
Theis et al. "A Note On the Evaluation of Generative Models," arXiv preprint, arXiv: 1511.01844, 10 pages (2015).
Theis et al. "Lossy Image Compression With Compressive Autoencoders," arXiv preprint, arXiv: 1703.00395, 19 pages (2017).
Torfason et al. "Towards Image Understanding From Deep Compression Without Decoding," arXiv preprint, arXiv: 1803.06131, 17 pages (2018).
Xue et al. "SegAN: Adversarial Network with Multi-scale L1 Loss for Medical Image Segmentation," Neuroinformatics, 16(3-4), pp. 383-392 (2018).
Augustsson et al. "Generative Adversarial Networks for Extreme Learned Image Compression," arXiv: 1804.02958, 26 pages (2018).

\* cited by examiner

400

Table 1000

| | Myocardium | | | | | | Blood Pool | | | | | |
|---|---|---|---|---|---|---|---|---|---|---|---|---|
| | Dice | | | IoU | | | Dice | | | IoU | | |
| | Uncomp. | SA | Emb | Uncomp. | SA | Emb | Uncomp. | SA | Emb | Uncomp. | SA | Emb |
| Img.1 | 0.895 | 0.868 | 0.899 | 0.809 | 0.756 | 0.817 | 0.915 | 0.876 | 0.927 | 0.844 | 0.818 | 0.864 |
| Img.2 | 0.829 | 0.798 | 0.831 | 0.708 | 0.681 | 0.711 | 0.951 | 0.903 | 0.948 | 0.916 | 0.875 | 0.921 |
| Img.3 | 0.811 | 0.782 | 0.815 | 0.672 | 0.652 | 0.674 | 0.883 | 0.858 | 0.888 | 0.807 | 0.754 | 0.808 |
| Img.4 | 0.877 | 0.853 | 0.874 | 0.780 | 0.758 | 0.776 | 0.955 | 0.906 | 0.956 | 0.913 | 0.872 | 0.915 |
| Img.5 | 0.809 | 0.778 | 0.810 | 0.679 | 0.647 | 0.681 | 0.883 | 0.849 | 0.881 | 0.806 | 0.779 | 0.788 |
| Average | 0.844 | 0.816 | 0.846 | 0.729 | 0.699 | 0.732 | 0.918 | 0.878 | 0.920 | 0.857 | 0.820 | 0.859 |
| bpp | Uncompressed (~1.1) | | | H.264 (~0.15) | | | SA(~0.04) | | | Emb(~0.014) | | |

FIG. 10

Table 1100

| | Vol (MB) | Trans (s) | Compr (s) | Recon (s) | Seg (s) | Total(s) |
|---|---|---|---|---|---|---|
| JPEG | 30 | 1.4 | 0.0013 | 0.0013 | 0.1 | 1.5026 |
| SegAN | 10 | 0.53 | 0.0015 | 0.0015 | 0.1 | 0.633 |
| Emb | 3.3 | 0.16 | 0.003 | 0.0003 | 0.1 | 0.2633 |

FIG. 11

SYSTEM AND METHOD FOR COMPRESSING IMAGES FOR REMOTE PROCESSING

BACKGROUND

Machine learning (ML) or deep learning (DL) has been growing exponentially in the last decade. ML and DL use neural networks (NN), which are mechanisms that basically mimic how a human brain learns. Advances in ML or DL have significantly boosted the performance of automatic image processing, e.g., image segmentation. However, many images require large data volume to represent high resolution and graphical fidelity. Transmission of the images (e.g., from local to cloud) may bring large latency overhead.

SUMMARY

In some embodiments, an exemplary image processing method can include: receiving an image; compressing, with a compression neural network, the image into a compressed representation; and performing, with a processing neural network, a machine learning task on the compressed representation to generate a learning result. The compression neural network and the processing neural network can be jointly trained.

In some embodiments, an exemplary an exemplary image processing system can include at least one memory for storing instructions and at least one processor. The at least one processor can be configured to execute the instructions to cause the system to perform: receiving an image; compressing, with a compression neural network, the image into a compressed representation; and performing, with a processing neural network, a machine learning task on the compressed representation to generate a learning result. The compression neural network and the processing neural network are jointly trained.

In some embodiments, an exemplary non-transitory computer readable storage medium storing a set of instructions that are executable by one or more processing devices to cause an image processing system to perform: receiving an image; compressing, with a compression neural network, the image into a compressed representation; and performing, with a processing neural network, a machine learning task on the compressed representation to generate a learning result. The compression neural network and the processing neural network are jointly trained.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 10 illustrates a table of exemplary segmentation results, according to some embodiments of the present disclosure.

FIG. 11 illustrates a table of exemplary latency, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems and methods consistent with aspects related to the invention as recited in the appended claims.

The applications of neural networks are extended to image processing. High computation complexity of neural networks and ever-increasing amount of images to be processed make a favorable option to process remotely, e.g., in a cloud (private or secured public cloud). However, image transmission latency from local to remote (e.g., the cloud) may exceed a total required computation time, resulting in difficulty to achieve real-time performance. Some existing image compression techniques are developed upon human visual system. But image perception pattern of the human visual system is fundamentally different from that of NN-based image processing.

Some embodiments of the present disclosure can orchestrate and coordinate image compression and processing to improve compression efficiency while maintaining or even enhance processing accuracy.

Figure 1:
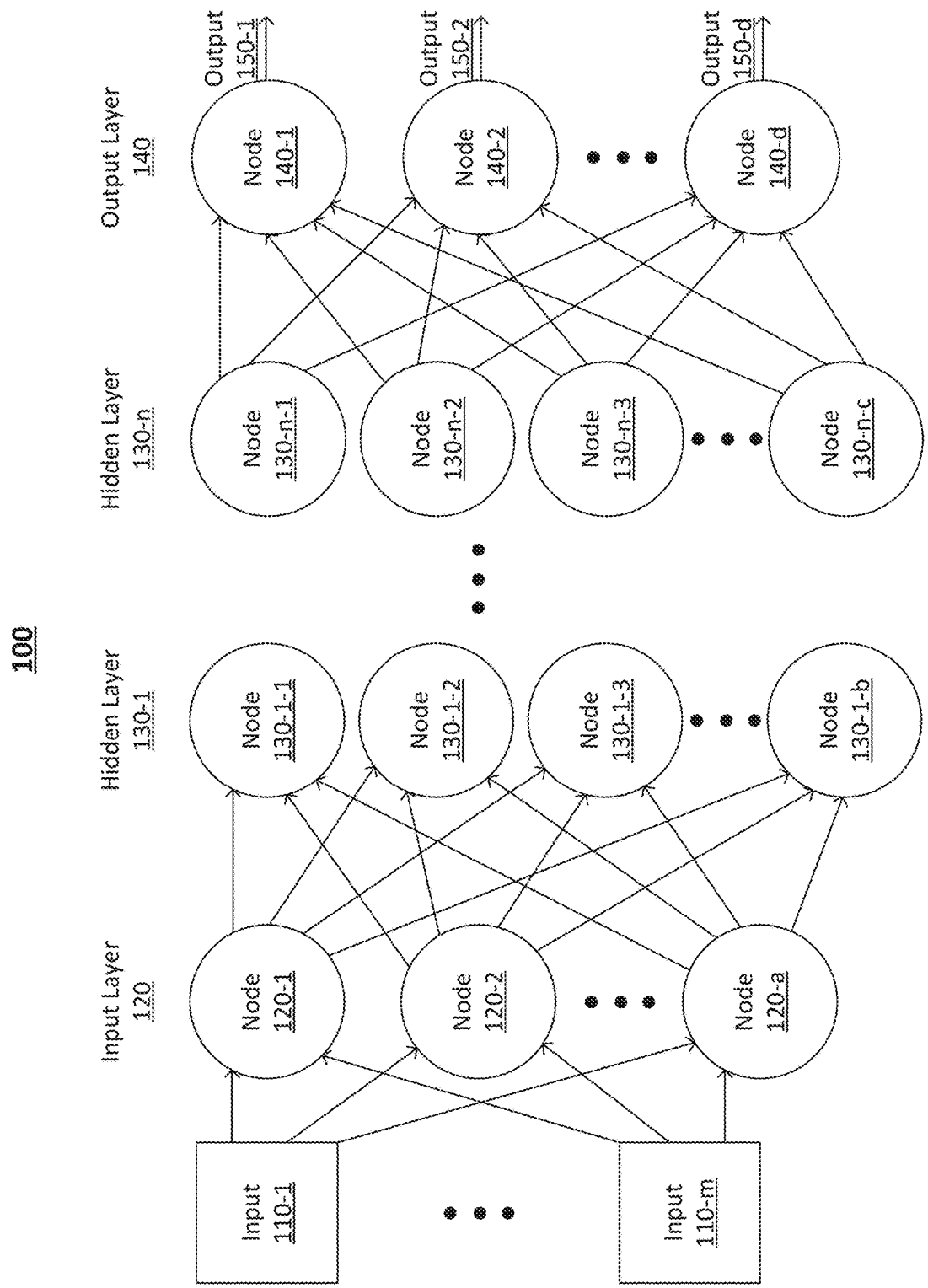
FIG. 1 is a schematic representation of a neural network, according to some embodiments of the present disclosure.

FIG. 1 is a schematic representation of a neural network (NN) 100. As depicted in FIG. 1, neural network 100 may include an input layer 120 that accepts inputs, e.g., input 110-1, . . . , input 110-m. Inputs may include an image, text, or any other structure or unstructured data for processing by neural network 100. In some embodiments, neural network 100 may accept a plurality of inputs simultaneously. For example, in FIG. 1, neural network 100 may accept up to m inputs simultaneously. Additionally or alternatively, input layer 120 may accept up to m inputs in rapid succession, e.g., such that input 110-1 is accepted by input layer 120 in one cycle, a second input is accepted by input layer 120 in a second cycle in which input layer 120 pushes data from input 110-1 to a first hidden layer, and so on. Any number of inputs can be used in simultaneous input, rapid succession input, or the like.

Input layer 120 may comprise one or more nodes, e.g., node 120-1, node 120-2, . . . , node 120-a. Each node may apply an activation function to corresponding input (e.g., one or more of input 110-1, . . . , input 110-m) and weight the output from the activation function by a particular weight associated with the node. An activation function may comprise a Heaviside step function, a Gaussian function, a multi-quadratic function, an inverse multiquadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 1, neural network 100 may include one or more hidden layers, e.g., hidden layer 130-1, . . . , hidden layer 130-n. Each hidden layer may comprise one or more nodes. For example, in FIG. 1, hidden layer 130-1 comprises node 130-1-1, node 130-1-2, node 130-1-3, . . . , node 130-1-b, and hidden layer 130-n comprises node 130-n-1, node 130-n-2, node 130-n-3, . . . , node 130-n-c. Similar to nodes of input layer 120, nodes of the hidden layers may apply activation functions to output from connected nodes of the previous layer and weight the output from the activation functions by particular weights associated with the nodes.

As further depicted in FIG. 1, neural network 100 may include an output layer 140 that finalizes outputs, e.g., output 150-1, output 150-2, . . . , output 150-d. Output layer 140 may comprise one or more nodes, e.g., node 140-1, node 140-2, . . . , node 140-d. Similar to nodes of input layer 120 and of the hidden layers, nodes of output layer 140 may apply activation functions to output from connected nodes of the previous layer and weight the output from the activation functions by particular weights associated with the nodes.

Although depicted as fully connected in FIG. 1, the layers of neural network 100 may use any connection scheme. For example, one or more layers (e.g., input layer 120, hidden layer 130-1, . . . , hidden layer 130-n, output layer 140, or the like) may be connected using a convolutional scheme, a sparsely connected scheme, or the like. Such embodiments may use fewer connections between one layer and a previous layer than depicted in FIG. 1.

Moreover, although depicted as a feedforward network in FIG. 1, neural network 100 may additionally or alternatively use backpropagation (e.g., by using long short-term memory nodes or the like). Accordingly, although neural network 100 is depicted similar to a CNN, neural network 100 may comprise a recurrent neural network (RNN) or any other neural network.

Figure 2A:
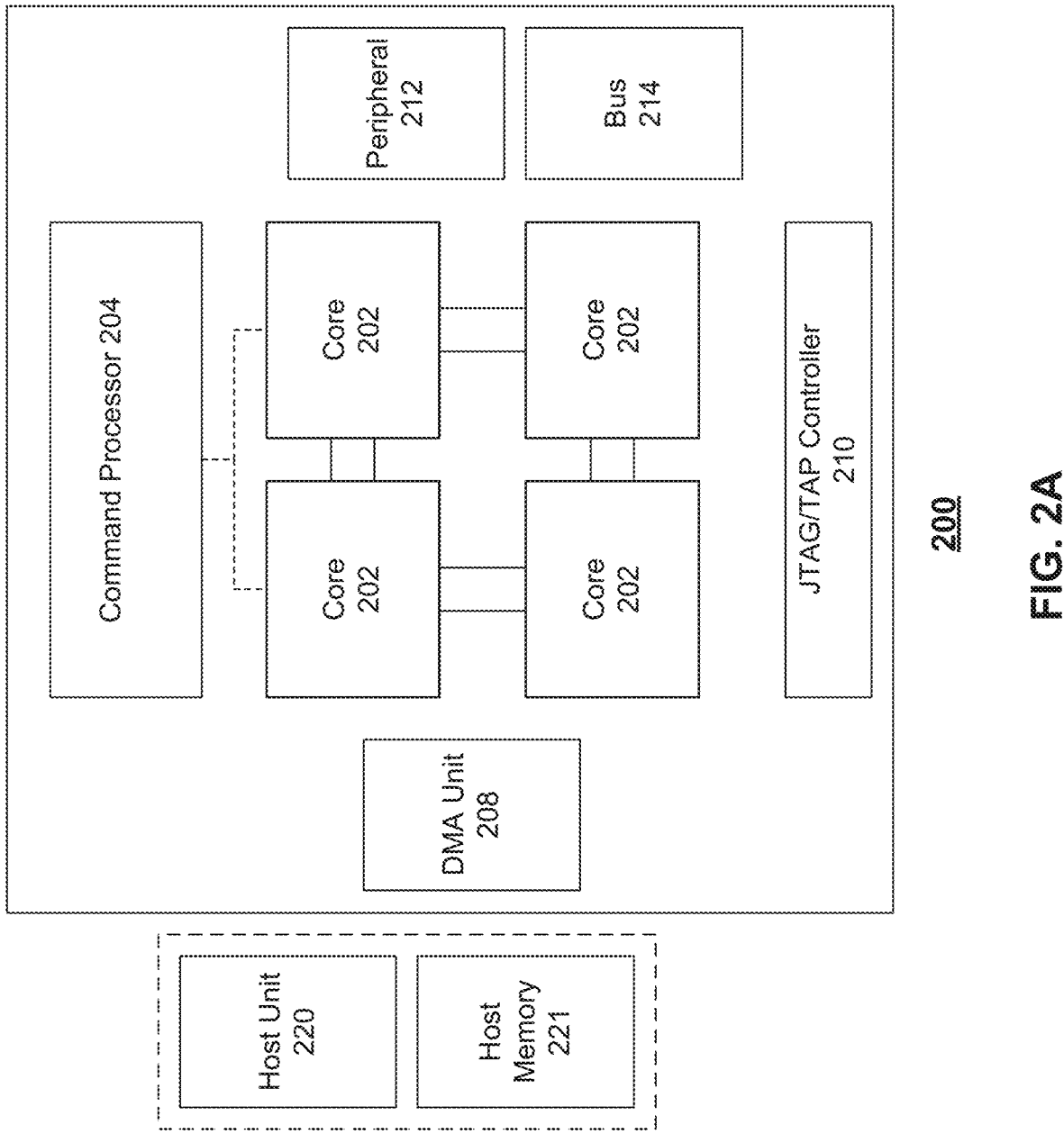
FIG. 2A illustrates an exemplary neural network accelerator architecture, according to some embodiments of the present disclosure.

FIG. 2A illustrates an exemplary neural network accelerator architecture 200, according to some embodiments of the present disclosure. In the context of this disclosure, a neural network accelerator may also be referred to as a machine learning accelerator or deep learning accelerator. In some embodiments, accelerator architecture 200 may be referred to as a neural network processing unit (NPU) architecture 200. As shown in FIG. 2A, accelerator architecture 200 can include a plurality of cores 202, a command processor 204, a direct memory access (DMA) unit 208, a Joint Test Action Group (JTAG)/Test Access Port (TAP) controller 210, a peripheral interface 212, a bus 214, and the like.

It is appreciated that cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. To perform the operation on the communicated data packets, cores 202 can include one or more processing elements for processing information in the data packets. Each processing element may comprise any number of processing units. According to some embodiments of the present disclosure, accelerator architecture 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail with respect to FIG. 2B.

Command processor 204 can interact with a host unit 220 and pass pertinent commands and data to corresponding core 202. In some embodiments, command processor 204 can interact with host unit under the supervision of kernel mode driver (KMD). In some embodiments, command processor 204 can modify the pertinent commands to each core 202, so that cores 202 can work in parallel as much as possible. The modified commands can be stored in an instruction buffer (not shown). In some embodiments, command processor 204 can be configured to coordinate one or more cores 202 for parallel execution.

DMA unit 208 can assist with transferring data between host memory 221 and accelerator architecture 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator architecture 200. For example, DMA unit 208 can assist with transferring data between multiple cores 202 or within each core. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 200 can include a second DMA unit, which can be used to transfer data between other accelerator architectures to allow multiple accelerator architectures to communicate directly without involving the host CPU.

JTAG/TAP controller 210 can specify a dedicated debug port implementing a serial communications interface (e.g., a JTAG interface) for low-overhead access to the accelerator without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the accelerator and other devices.

Bus 214 (such as a I2C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Accelerator architecture 200 can also communicate with a host unit 220. Host unit 220 can be one or more processing unit (e.g., an X86 central processing unit). As shown in FIG. 2A, host unit 220 may be associated with host memory 221. In some embodiments, host memory 221 may be an integral memory or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory integrated within accelerator chip, acting as a higher-level cache. The data stored in host memory 221 may be transferred to accelerator architecture 200 to be used for executing neural network models.

In some embodiments, a host system having host unit 220 and host memory 221 can comprise a compiler (not shown). The compiler is a program or computer software that transforms computer codes written in one programming language into instructions for accelerator architecture 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 200. As discussed above, these commands can be further processed by command processor 204 of accelerator architecture 200, temporarily stored in an instruction buffer of accelerator architecture 200, and distributed to corresponding one or more cores (e.g., cores 202 in FIG. 2A) or processing elements. Some of the commands may instruct a DMA unit (e.g., DMA unit 208 of FIG. 2A) to load instructions and data from host memory (e.g., host memory 221 of FIG. 2A) into accelerator architecture 200. The loaded instructions may then be distributed to each core (e.g., core 202 of FIG. 2A) assigned with the corresponding task, and the one or more cores may process these instructions.

Figure 2B:
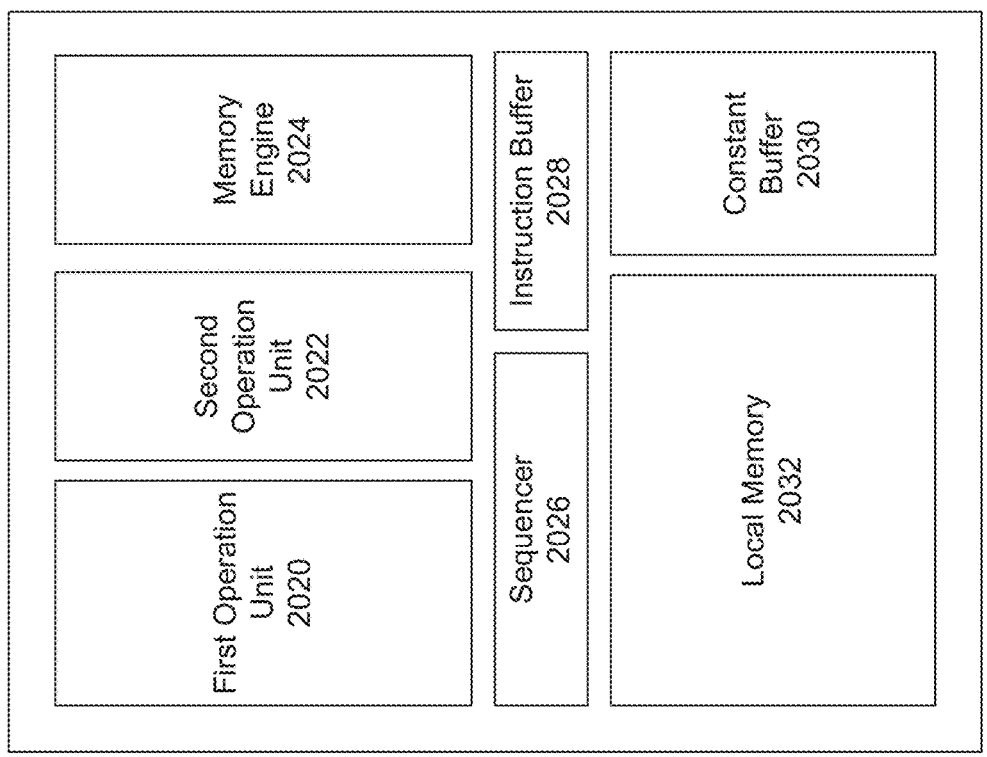
FIG. 2B illustrates an exemplary neural network accelerator core architecture, according to some embodiments of the present disclosure.

It is appreciated that the first few instructions received by the cores 202 may instruct the cores 202 to load/store data from host memory 221 into one or more local memories of the cores (e.g., local memory 2032 of FIG. 2B). Each core 202 may then initiate the instruction pipeline, which involves fetching the instruction (e.g., via a sequencer) from the instruction buffer, decoding the instruction (e.g., via a DMA unit 208 of FIG. 2A), generating local memory addresses (e.g., corresponding to an operand), reading the source data, executing or loading/storing operations, and then writing back results.

According to some embodiments, accelerator architecture 200 can further include a global memory (not shown) having memory blocks (e.g., 4 blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator architecture 200 can further include memory controller (not shown) configured to manage reading and writing of data to and from a specific memory block (e.g., HBM2) within global memory. For example, memory controller can manage read/write data coming from core of another accelerator (e.g., from DMA unit 208 or a DMA unit corresponding to the another accelerator) or from core 202 (e.g., from a local memory in core 202). It is appreciated that more than one memory controller can be provided in accelerator architecture 200. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While accelerator architecture 200 of FIG. 2A can be used for convolutional neural networks (CNNs) in some embodiments of the present disclosure, it is appreciated that accelerator architecture 200 of FIG. 2A can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), tensor processing units (TPUs), any other types of accelerators, or the like.

FIG. 2B illustrates an exemplary neural network accelerator core architecture, according to some embodiments of the present disclosure. As shown in FIG. 2B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copy from a local memory (e.g., local memory 2032 of FIG. 2B) into a corresponding operation unit. Memory engine 2024 can also be configured to perform matrix transposition to make the matrix suitable to be used in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to the sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With the massive storage space, most of data access can be performed within core 202 with reduced latency caused by data access. In some embodiments, to minimize data loading latency and energy consumption, static random access memory (SRAM) integrated on chip can be used as local memory 2032. In some embodiments, local memory 2032 can have a capacity of 192 MB or above. According to some embodiments of the present disclosure, local memory 2032 be evenly distributed on chip to relieve dense wiring and heating issues.

Figure 2C:
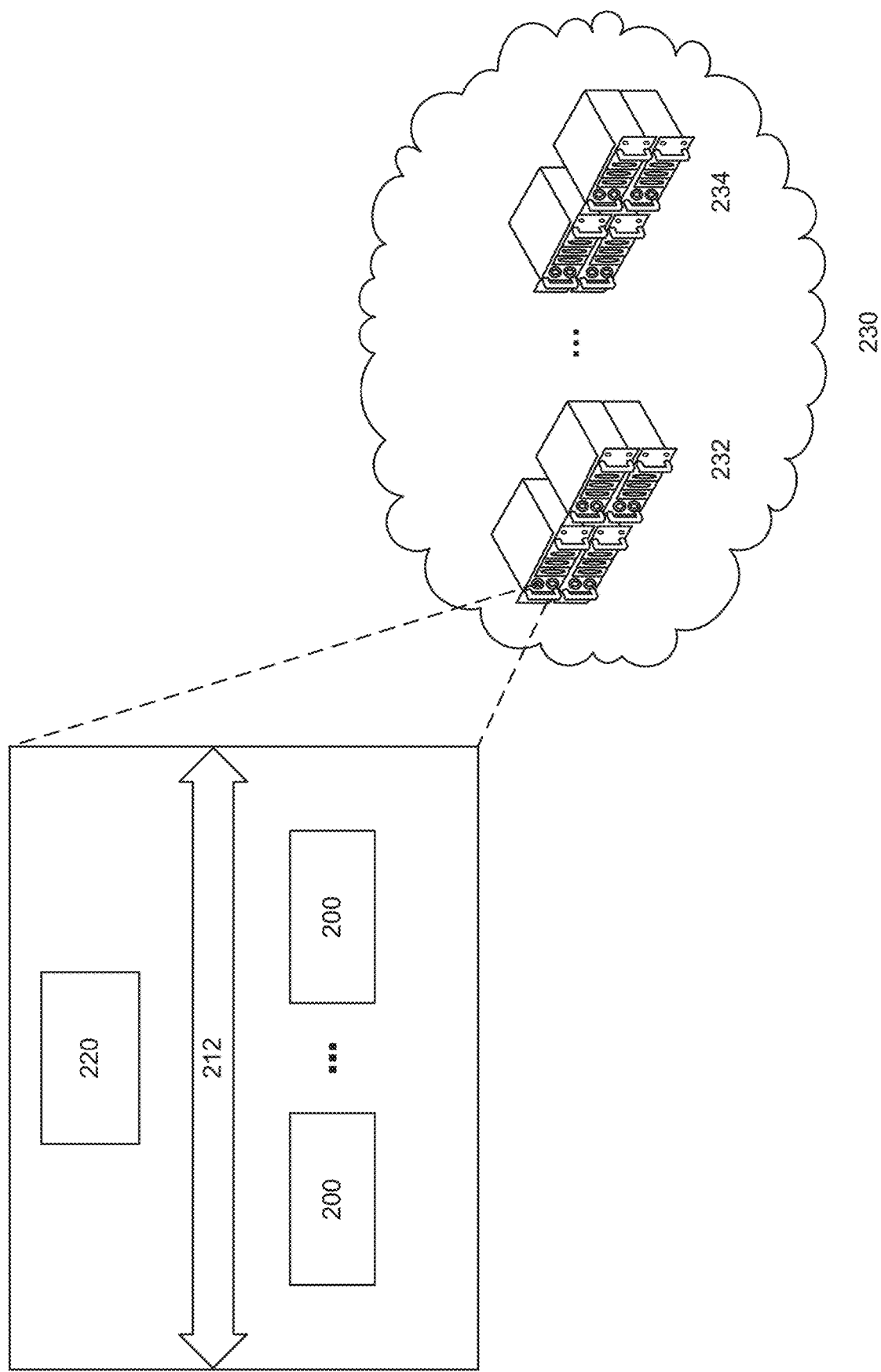
FIG. 2C illustrates a schematic diagram of an exemplary cloud system incorporating a neural network accelerator, according to some embodiments of the present disclosure.

FIG. 2C illustrates a schematic diagram of an exemplary cloud system incorporating a neural network accelerator 200, according to some embodiments of the present disclosure. As shown in FIG. 2C, cloud system 230 can provide a cloud service with artificial intelligence (AI) capabilities and can include a plurality of computing servers (e.g., 232 and 234). In some embodiments, a computing server 232 can, for example, incorporate a neural network accelerator architecture 200 of FIG. 2A. Neural network accelerator architecture 200 is shown in FIG. 2C in a simplified manner for simplicity and clarity.

With the assistance of neural network accelerator architecture 200, cloud system 230 can provide the extended AI capabilities of image recognition, facial recognition, translations, 3D modeling, and the like. It is appreciated that neural network accelerator architecture 200 can be deployed to computing devices in other forms. For example, neural network accelerator architecture 200 can also be integrated in a computing device, such as a smart phone, a tablet, and a wearable device.

Moreover, while a neural network accelerator architecture is shown in FIGS. 2A-2B, it is appreciated that any accelerator that provides the ability to perform parallel computation can be used.

Figure 3:
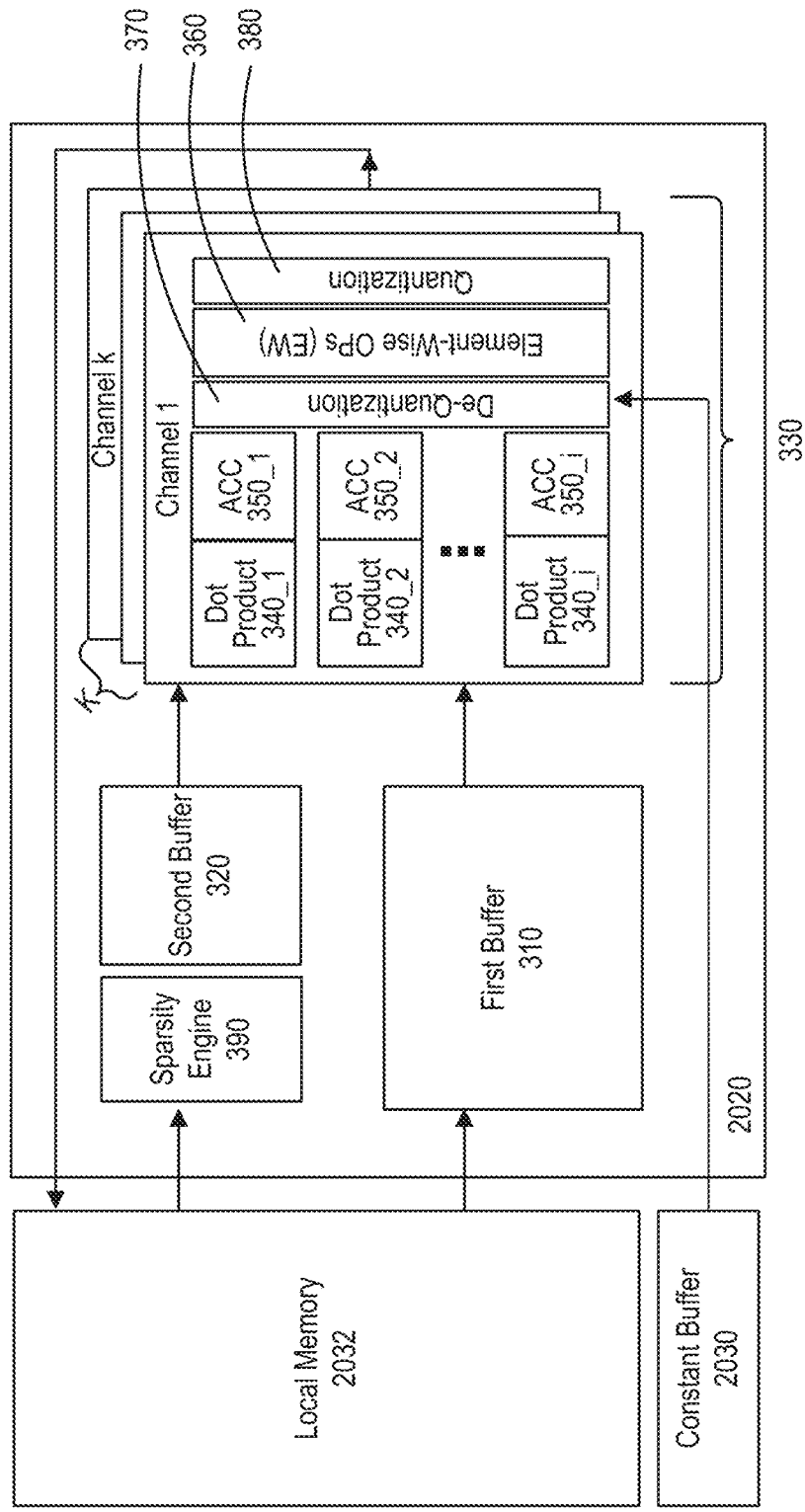
FIG. 3 illustrates an exemplary operation unit configuration, according to some embodiments of the present disclosure.

FIG. 3 illustrates an exemplary operation unit configuration 300, according to some embodiments of the present disclosure. According to some embodiments of the present disclosure, operation unit can be first operation unit (e.g., first operation unit 2020 in FIG. 2B). Operation unit 2020 may include a first buffer 310, a second buffer 320, and a processing array 330.

First buffer 310 may be configured to store input data. In some embodiments, data stored in first buffer 310 can be input data to be used in processing array 330 for execution. In some embodiments, the input data can be fetched from local memory (e.g., local memory 2032 in FIG. 2B). First buffer 310 may be configured to support reuse or share of data to be used in processing array 330. In some embodiments, input data stored in first buffer 310 may be activation data for a convolution operation.

Second buffer 320 may be configured to store weight data. In some embodiments, weight data stored in second buffer 320 can be used in processing array 330 for execution. In some embodiments, the weight data stored in second buffer 320 can be fetched from local memory (e.g., local memory 2032 in FIG. 1B). In some embodiments, weight data stored in second buffer 320 may be filter data for a convolution operation.

According to some embodiments of the present disclosure, weight data stored in second buffer 320 can be compressed data. For example, weight data can be pruned data to save memory space on chip. In some embodiments, operation unit 2020 can further include a sparsity engine 390. Sparsity engine 390 can be configured to unzip compressed weight data to be used in processing array 330.

Processing array 330 may have a plurality of layers (e.g., K layers). According to some embodiments of the present disclosure, each layer of processing array 330 may include a plurality of processing strings, which may perform computations in parallel. For example, first processing string included in the first layer of processing array 330 can comprise a first multiplier (e.g., dot product) 340_1 and a first accumulator (ACC) 350_1 and second processing string can comprise a second multiplier 340_2 and a second accumulator 350_2. Similarly, i-th processing string in the first layer can comprise an i-th multiplier 340_i and an i-th accumulator 350_i.

In some embodiments, processing array 330 can perform computations under SIMD control. For example, when performing a convolution operation, each layer of processing array 330 can execute same instructions with different data.

According to some embodiments of the present disclosure, processing array 330 shown in FIG. 3 can be included in a core (e.g., core 202 in FIG. 2B). When a number of processing strings (e.g., i number of processing strings) included in one layer of processing array 330 is smaller than a number of work items (e.g., B number of work items), i number of work items can be executed by processing array 330 and subsequently the rest of work items (B−i number of work items) can be executed by the processing array 330 in some embodiments. In some other embodiments, i number of work items can be executed by processing array 330 and the rest of work items can be executed by another processing array 330 in another core.

According to some embodiments of the present disclosure, processing array 330 may further include an element-wise operation processor (OP) 360. In some embodiments, element-wise operation processor 360 can be positioned at the end of processing strings. In some embodiments, processing strings in each layer of processing array 330 can share element-wise operation processor 360. For example, i number of processing strings in the first layer of processing array 330 can share element-wise operation processor 360. In some embodiments, element-wise operation processor 360 in the first layer of processing array 330 can perform its element-wise operation on each of output values, from accumulators 350_1 to 350_i, sequentially. Similarly, element-wise operation processor 360 in the Kth layer of processing array 330 can perform its element-wise operation on each of output values, from accumulators 350_1 to 350_i, sequentially. In some embodiments, element-wise operation processor 360 can be configured to perform a plurality of element-wise operations. In some embodiments, element-wise operation performed by the element-wise operation processor 360 may include an activation function such as ReLU function, ReLU6 function, Leaky ReLU function, Sigmoid function, Tan h function, or the like.

In some embodiments, multiplier 340 or accumulator 350 may be configured to perform its operation on different data type from what the element-wise operation processor 360 performs its operations on. For example, multiplier 340 or accumulator 350 can be configured to perform its operations on integer type data such as Int 8, Int 16, and the like and element-wise operation processor 360 can perform its operations on floating point type data such as FP24, and the like. Therefore, according to some embodiments of the present disclosure, processing array 330 may further include de-quantizer 370 and quantizer 380 with element-wise operation processor 360 positioned therebetween. In some embodiments, batch normalization operations can be merged to de-quantizer 370 because both de-quantizer 370 and batch normalization operations can be performed by multiplication operations and addition operations with constants, which can be provided from constant buffer 2030. In some embodiments, batch normalization operations and de-quantization operations can be merged into one operation by compiler. As shown in FIG. 3, constant buffer 2030 can provide constants to de-quantizer 370 for de-quantization or batch normalization.

Figure 4:
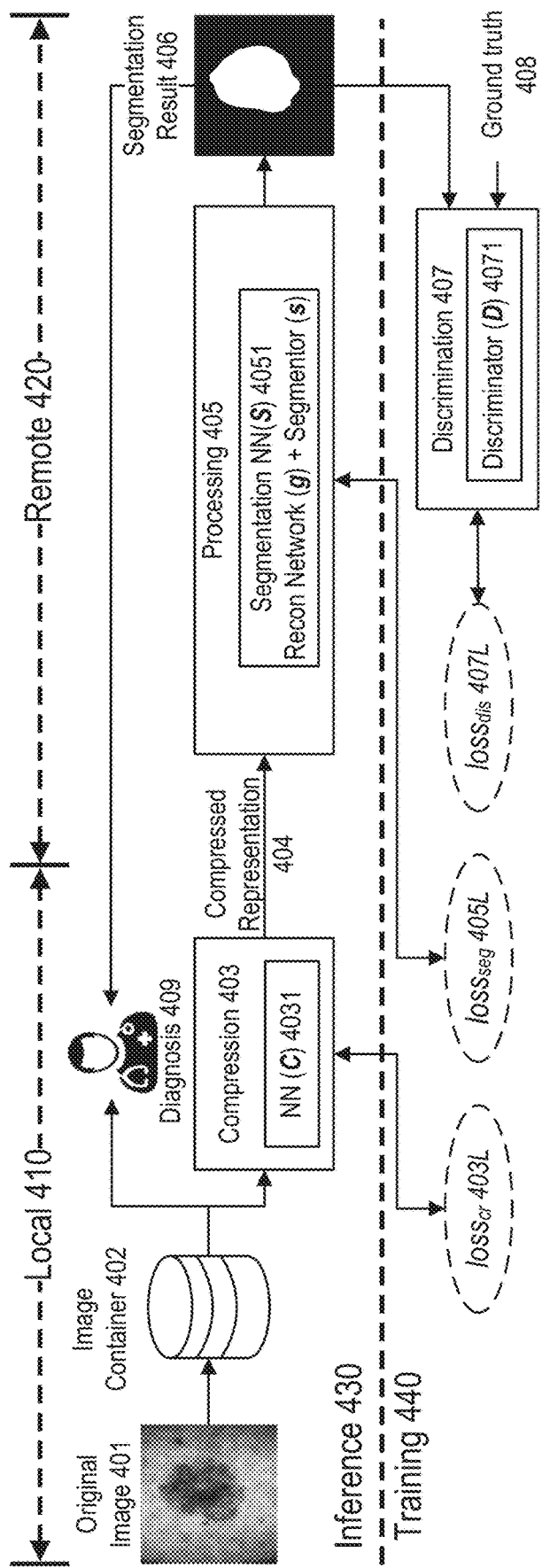
FIG. 4 is a schematic representation of an exemplary image processing, according to some embodiments of the present disclosure.

FIG. 4 is a schematic representation of an exemplary image processing 400, according to some embodiments of the present disclosure. It is appreciated that image processing 400 can be implemented, at least in part, by neural network accelerator architecture 200 of FIG. 2A and FIG. 2C. Moreover, image processing 400 can also be implemented, at least in part, by a computer program product, embodied in a computer-readable medium, including computer-executable instructions, such as program code, executed by computers, such as the systems or architectures as shown in FIG. 2A, FIG. 2B, FIG. 2C, and FIG. 3. In some embodiments, a host unit (e.g., host unit 220 of FIG. 2A) may compile software code for generating instructions for providing to one or more neural network accelerators (e.g., neural network accelerator 200 of FIG. 2A) to perform image processing 400.

As shown in FIG. 4, during inference 430, an image 401 can be obtained at a local site 410. For example, a medical 3D Computed Tomography (CT) image 401 can be obtained at hospital. In some embodiments, image 401 can be stored in an image container 402, e.g., a memory, a storage device, or the like. Image 401 can be input to a compression stage 403 that can compress image 401 and generate a compressed representation. Compression stage 403 can include a compression neural network (C) 4031 and perform a NN-based compression on image 401. Compressed representation can include a sequence of compressed channels (or features, feature maps), each of which can include a plurality of signals (e.g., a matrix of signals). Compression neural network 4031 can be a CNN, a RNN, or the like. For example, at compression stage 403, a CNN can utilize a plurality of filters (or kernels) to compress an RGB 3D CT image 401 and generate a plurality of compressed channels, each of which can include a matrix of signals. In some embodiments, neural network 4031 can pre-filter some undesired features in the input image 401.

Figure 5:
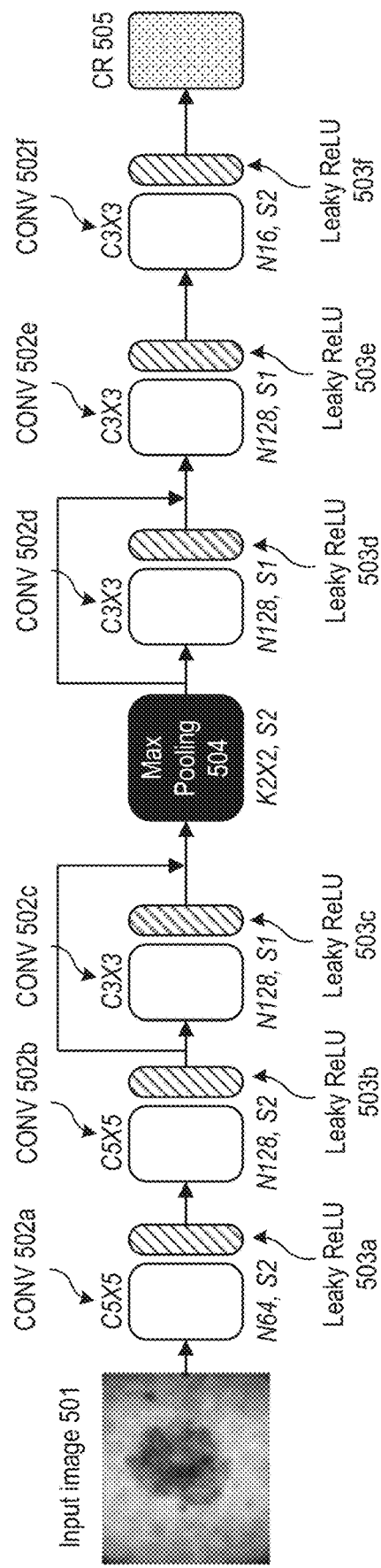
FIG. 5 is a schematic diagram of an exemplary compression neural network, according to some embodiments of the present disclosure.

FIG. 5 illustrates a schematic diagram of an exemplary compression neural network 500, according to some embodiments of the present disclosure. It is appreciated that, although compression neural network 500 is illustrated as a CNN in FIG. 5, it can be other types of neural network, e.g., RNN or the like. Compression neural network 500 can be implemented as neural network 4031 of FIG. 4.

As depicted in FIG. 5, compression neural network 500 can include a plurality of blocks each of which can include one or more layers. For example, compression neural network 500 can include convolution (CONV) blocks 502a-502f, Leaky ReLU blocks 503a-503f, max pooling block 504, and the like. Convolution blocks 502a-502f each can perform a convolution operation with different parameters. For example, convolution block 502a can have a convolution filter with a size of 5×5 (C5×5 as shown in FIG. 5), a convolution filter number of 64 (N64 as shown in FIG. 5), and a stride of 2 (S2 as shown in FIG. 5). Convolution blocks 502b-502f can have different convolution filter sizes, convolution filter numbers, and strides, as shown in FIG. 5.

Leaky ReLU blocks 503a-503f can be connected to convolution blocks 502a-502f, respectively, and configured to apply an activation function Leaky ReLU. It is appreciated that, in some embodiments, Leaky ReLU block can be another type of activation function block, including, but being limited to, ReLU block, Sigmoid block, Tan h block, and the like.

Max pooling block 504 can be connected between front convolution blocks 502a-502c plus Leaky ReLU blocks 503a-503c and back convolution blocks 502d-502f plus Leaky ReLU blocks 503d-503f, as shown in FIG. 5. Max pooling block 504 can be configured to perform a specific pooling operation. For example, max pooling block 504 can have a pooling filter with a size of 2×2 (K2×2 as shown in FIG. 5) and a stride of 2 (S2 as shown in FIG. 5).

During execution, an image 501 can be input into convolution block 502a of compression neural network 500 that can perform a convolution operation with 64 convolution filters of 5×5 size and a stride of 2. Then, Leaky ReLU block 503a can apply a Leaky ReLu function on an output of convolution block 502a. Similarly, an output of Leaky ReLU block 503a can go through, sequentially, convolution block 502b, Leaky ReLU block 503b, convolution block 502c, and Leaky ReLU block 503c, and enter max pooling block 504. Moreover, as another branch, an output of Leaky ReLU block 503b can also be connected to max pooling block 504, bypassing convolution block 502c, and Leaky ReLU block 503c. Max pooling block 504 can perform a pooling operation on input data with a pooling filter of 2×2 size and a stride of 2. An output of max pooling block 504 can be input into convolution block 502d and go through, sequentially, convolution block 502d, Leaky ReLU block 503d, convolution block 502e, Leaky ReLU block 503e, convolution block 502f, and Leaky ReLU block 503f. Moreover, as another branch, the output of max pooling block 504 can also be input into convolution block 502e and go through, sequentially, convolution block 502e, Leaky ReLU block 503e, convolution block 502f, and Leaky ReLU block 503f. A compression result, e.g., compression representation (CR) 505, can be output from Leaky ReLU block 503f of compression neural network 500. Compressed representation 505 can include a sequence of compressed channels. The compressed channel can include a plurality of signals (e.g., a matrix of signals).

Referring back to FIG. 4, the compressed representation (e.g., compression representation 505 of FIG. 5) can be transmitted to processing stage 405 for further processing. In some embodiments, processing stage 405 can occur at one or more remote sites 420. Processing stage 405 can include a processing neural network to perform a task on the compressed representation 404. The task can include, but is not limited to, image segmentation (e.g., semantic segmentation), image recognition, image classification, object detection, or the like. The processing neural network can be a CNN, a RNN, or the like, and pre-trained to perform a specific task. The processing neural network can include at least one of a segmentation neural network, a recognition neural network, a classification neural network, an object detection neural network, or the like. For example, processing stage 405 can include a segmentation neural network (S) 4051 that can perform an image segmentation for image 401. In some embodiment, segmentation neural network 4051 can include a feature reconstruction network (Recon Network) (g) and a segmentor neural network (s). Feature reconstruction network can reconstruct some features of the image, and segmentor neural network can perform an image segmentation on the reconstructed features.

Figure 6:
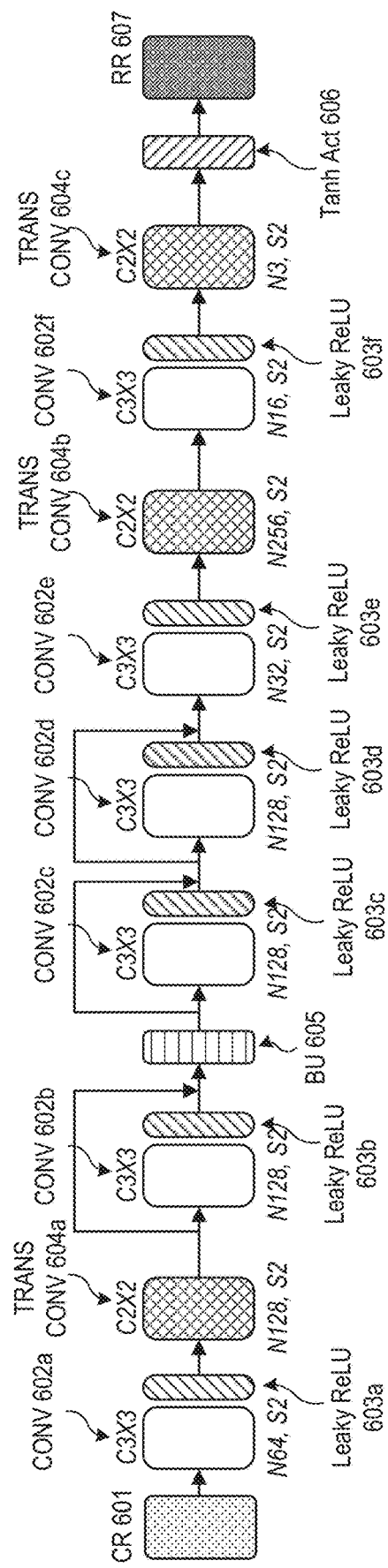
FIG. 6 is a schematic representation of an exemplary feature reconstruction neural network, according to some embodiments of the present disclosure.

FIG. 6 illustrates a schematic representation of an exemplary feature reconstruction network 600, according to some embodiments of the present disclosure. Feature reconstruction network 600 can be implemented as the reconstruction network (g) of FIG. 4. It is appreciated that, although feature reconstruction network 600 is illustrated as a CNN in FIG. 6, it can be other types of neural network, e.g., RNN or the like. In some embodiments, feature reconstruction network 600 can only reconstruct a part of features of the image.

As depicted in FIG. 6, feature reconstruction network 600 can include a plurality of blocks each of which can include one or more layers. For example, feature reconstruction network 600 can include, sequentially, convolution (CONV) block 602a, Leaky ReLU block 603a, transposed convolution (TRANS CONV) block 604a, convolution block 602b, Leaky ReLU block 603b, bilinear upsampling (BU) block 605, convolution block 602c, Leaky ReLU block 603c, convolution block 602d, Leaky ReLU block 603d, convolution block 602e, Leaky ReLU block 603e, transposed convolution block 604b, convolution block 602f, Leaky ReLU block 603f, transposed convolution block 604c, Tan h activation (Tan h Act) block 606, and the like. These blocks can be connected sequentially, as shown in FIG. 6. Moreover, transposed convolution block 604a can also be connected to bilinear upsampling block 605, bypassing convolution block 602b and Leaky ReLU block 603b. Similarly, bilinear upsampling block 605 can be connected to convolution block 602d, bypassing convolution block 602c and Leaky ReLU block 603c, and Leaky ReLU block 603c can be connected to convolution block 602e, bypassing convolution block 602d and Leaky ReLU block 603d, as shown in FIG. 6.

Convolution blocks 602a-602f each can perform a convolution operation with different parameters. For example, convolution block 602a can have a convolution filter with a size of 3×3 (C3×3 as shown in FIG. 6), a convolution filter number of 64 (N64 as shown in FIG. 6), and a stride of 2 (S2 as shown in FIG. 6). Convolution blocks 602b-602f can have different convolution filter sizes, convolution filter numbers, and strides, as shown in FIG. 6.

Leaky ReLU blocks 603a-603f can be connected to convolution blocks 602a-602f, respectively, and configured to apply an activation function Leaky ReLU. It is appreciated that, in some embodiments, Leaky ReLU block can be another type of activation function block, including, but being limited to, ReLU block, Sigmoid block, Tan h block, and the like.

Transposed convolution blocks 604a-604c each can perform a transposed convolution or deconvolution operation and have different parameters. For example, transposed convolution block 604a can have a deconvolution filter with a size of 2×2 (C2×2 as shown in FIG. 6), a deconvolution filter number of 128 (N128 as shown in FIG. 6), and a stride of 2 (S2 as shown in FIG. 6). Transposed convolution blocks 604b-604c can have different deconvolution filter sizes, deconvolution filter numbers, and strides, as shown in FIG. 6.

Tan h activation block 606 can be connected to transposed convolution block 604c and configured to apply an activation function Tan h. Bilinear upsampling block 605 can be connected to Leaky ReLU block 603b and transposed convolution block 604a, and configured to perform a bilinear upsampling.

During execution, a compressed representation (CR) 601 can be input into convolution block 602a of feature reconstruction network 600 that can perform a convolution operation with 64 convolution filters of 3×3 size and a stride of 2. Then, Leaky ReLU block 603a can apply a Leaky ReLu function on an output of convolution block 602a. An output of Leaky ReLU block 603a can be input into transposed convolution block 604a that can perform a deconvolution on it. An output of transposed convolution block 604a can enter convolution block 602b and go though Leaky ReLU block 603b, to bilinear upsampling block 605. Moreover, as another branch, an output of transposed convolution block 604a can be input to bilinear upsampling block 605, bypassing convolution block 602b and Leaky ReLU block 603b. Bilinear upsampling block 605 can perform a bilinear upsampling on its input and output data to convolution block 602c and Leaky ReLU block 603c, and as another branch, to convolution block 602d, bypassing convolution block 602c and Leaky ReLU block 603c. Similarly, an output of Leaky ReLU block 603c can go through, sequentially, convolution block 602d, Leaky ReLU block 603d, convolution block 602e, Leaky ReLU block 603e, transposed convolution block 604b, convolution block 602f, Leaky ReLU block 603f, transposed convolution block 604c, and Tan h activation block 606. Moreover, as another branch, the output of Leaky ReLU block 603c can bypass convolution block 602d and Leaky ReLU block 603d, and go through, sequentially, convolution block 602e, Leaky ReLU block 603e, transposed convolution block 604b, convolution block 602f, Leaky ReLU block 603f, transposed convolution block 604c, and Tan h activation block 606. Tan h activation block 606 can output a reconstructed representation (RR) 607. In some embodiments, reconstructed representation 607 can include a part of feature maps of the original image. The reconstructed feature maps can be used by segmentor to perform a segmentation (e.g., generating a probability label map).

Figure 7:
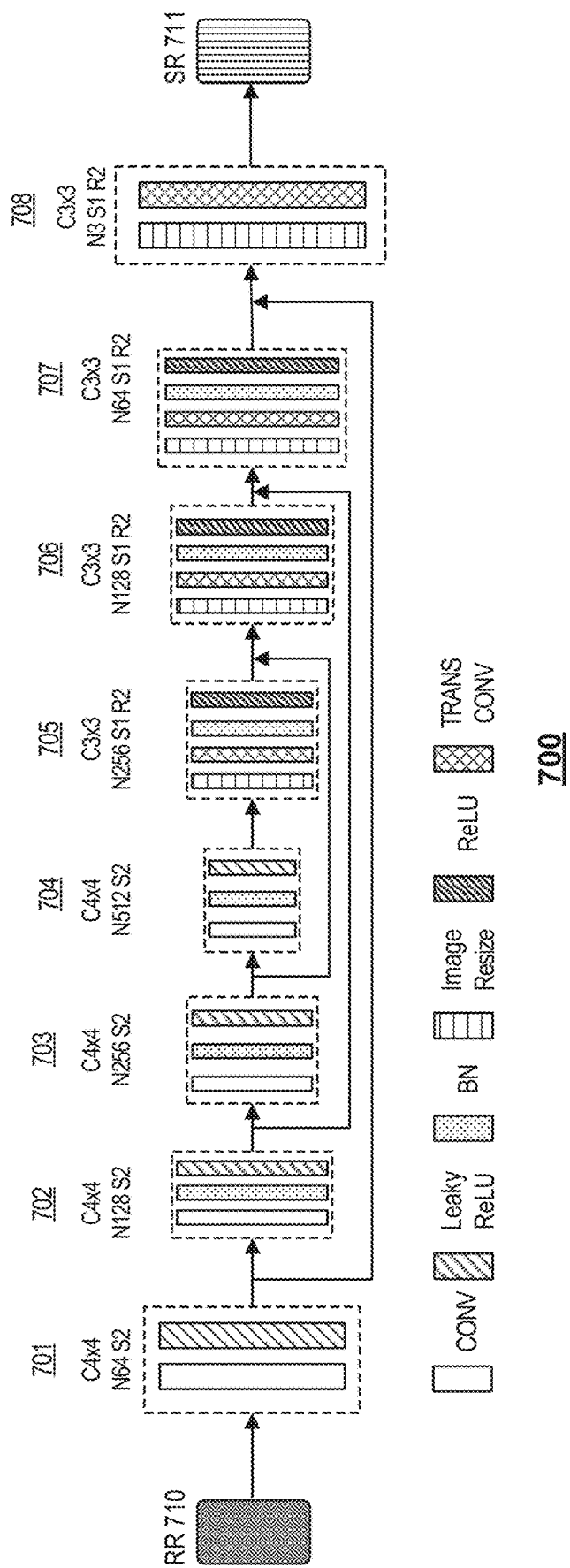
FIG. 7 is a schematic representation of an exemplary segmentor neural network, according to some embodiments of the present disclosure.

FIG. 7 illustrates a schematic representation of an exemplary segmentor neural network 700, according to some embodiments of the present disclosure. Segmentor neural network 700 can be implemented as the segmentor neural network (s) of FIG. 4. It is appreciated that, although segmentor neural network 700 is illustrated as a CNN in FIG. 7, it can be other types of neural network, e.g., RNN or the like.

As depicted in FIG. 7, segmentor neural network 700 can include a plurality of blocks and sub-blocks. Each block or sub-block can include one or more layers. For example, segmentor neural network 700 can include, sequentially, blocks 701-708. Block 701 can include a convolution (CONV) sub-block, a Leaky ReLU sub-block, and the like. Blocks 702-704 each can include a convolution sub-block, a batch normalization (BN) sub-block, a Leaky ReLU sub-block, and the like. The batch normalization sub-block can perform a batch normalization operation on its input. Blocks 705-707 each can include an image resize sub-block, a transposed convolution (TRANS CONV) sub-block, a batch normalization block, a ReLU sub-block, and the like. The image resize sub-block can process its input to resize the image. The ReLU sub-block can apply an activation function ReLu on its input. Block 708 can include an image resize sub-block, a transposed convolution sub-block, and the like. These sub-blocks can be connected sequentially, as shown in FIG. 6. Moreover, block 701 can also be connected to block 708, bypassing blocks 702-707. Similarly, block 702 can also be connected to block 707, bypassing blocks 703-706, and block 703 can also be connected to block 706, bypassing blocks 704 and 705.

Blocks 701-708 (or their sub-blocks) can have different parameters. For example, block 702 can perform an operation with a convolution filter having a size of 4×4 (C4×4 as shown in FIG. 7), a convolution filter number of 128 (N128 as shown in FIG. 7), and a stride of 2 (S2 as shown in FIG. 7). Similarly, blocks 701, 703, and 704 can have different convolution filter sizes, convolution filter numbers, and strides, as shown in FIG. 7. As another example, block 705 can perform an operation with a deconvolution filter having a size of 3×3 (C3×3 as shown in FIG. 7), a deconvolution filter number of 256 (N256 as shown in FIG. 7), a stride of 1 (S1 as shown in FIG. 7), and resize magnification of 2 (R2 as shown in FIG. 7). Similarly, blocks 706-708 can have different deconvolution filter sizes, deconvolution filter numbers, strides, and resize magnification, as shown in FIG. 7.

During execution, a reconstructed representation (RR) 710 (e.g. reconstructed representation 607) can be input into block 701 of segmentor neural network 700. Block 701 can perform a convolution operation with 64 convolution filters of 4×4 size and a stride of 2 and apply a Leaky ReLu function on reconstructed representation 710. An output of block 701 can go through blocks 702-708 that can perform respective operations on their inputs. Moreover, as different branches, sequential data stream in segmentor neural network 700 can bypass blocks 702-707, blocks 703-706, or blocks 704-705. Block 708 can output a segmentation result (SR) 711 that can include segmentation (or predicted) label maps.

Referring back to FIG. 4, segmentation neural network 4051 can output segmentation result 406 (e.g., segmentation result 711 of FIG. 7). For example, segmentation result 406 can be provided to a doctor or a computer for diagnosis 409. The doctor can be at local site 410, e.g., a hospital, or another place, e.g., home. At diagnosis stage 409, the doctor can obtain the original image from image container 402 and compare the original image with segmentation result 406 from remote 420 to make a correct diagnosis.

In some embodiments of the present disclosure, compression neural network 4031 (e.g., compression neural network 500 of FIG. 5) and segmentation neural network 4051 (e.g., feature reconstruction network 600 of FIG. 6 and segmentor neural network 700 of FIG. 7) can be trained. During training 440, as shown in FIG. 4, image processing 400 can include a discrimination stage 407. Discrimination stage 407 can include a discriminator neural network (D) 4071 that can be a CNN, a RNN, or the like. At discrimination stage 407, discriminator neural network 4071 can receive segmentation result 406 from segmentation neural network 4051 and ground truth label map 408. Segmentation result 406 can include predicted label maps. Discriminator neural network 4071 can compare predicted label maps with ground truth label map 408. The difference between predicted label maps with ground truth label map 408 can be used to train compression neural network 4031, segmentation neural network 4051 and discriminator neural network 4071.

Figure 8:
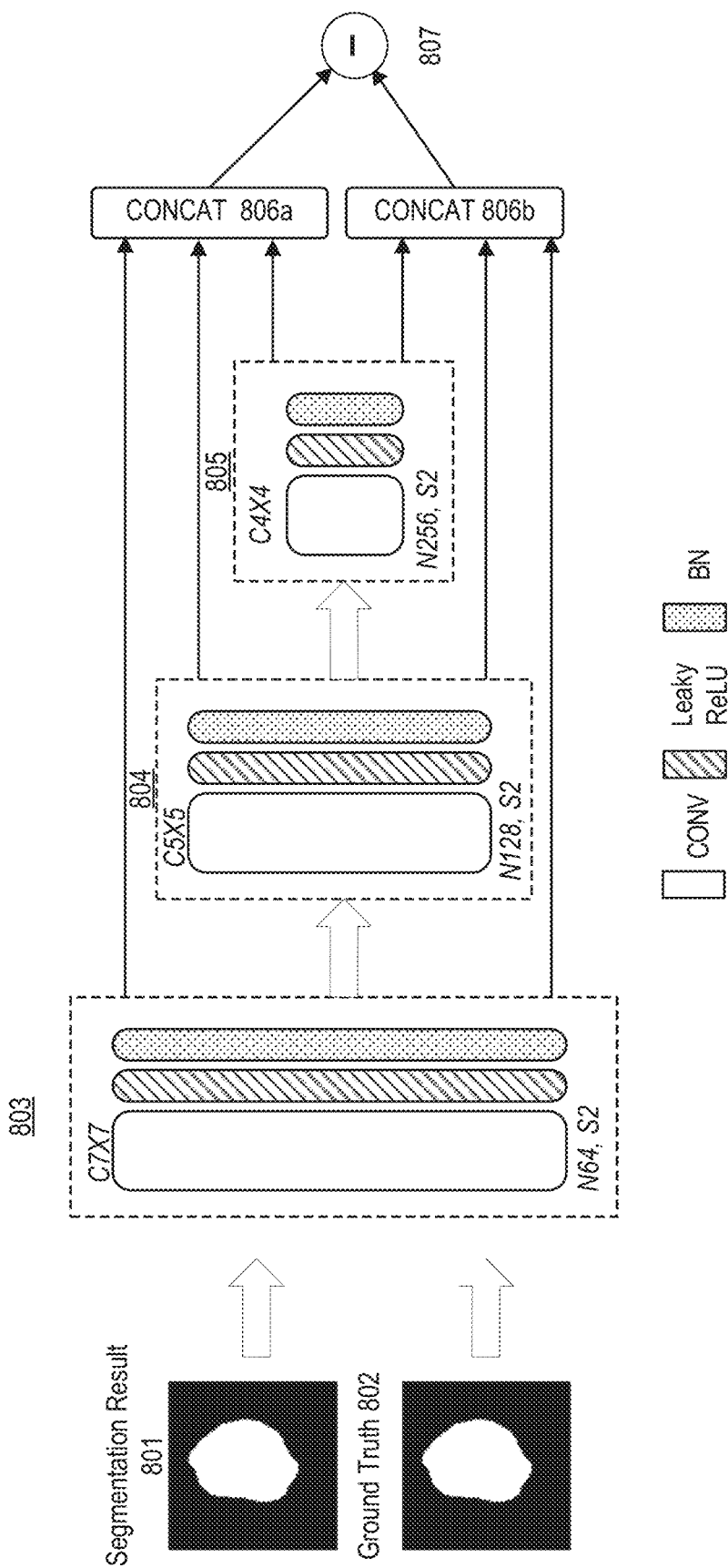
FIG. 8 is a schematic representation of an exemplary discriminator neural network, according to some embodiments of the present disclosure.

FIG. 8 illustrates a schematic representation of an exemplary discriminator neural network 800, according to some embodiments of the present disclosure. Discriminator neural network 800 can be implemented as the discriminator (D) 4071 of FIG. 4. It is appreciated that, although discriminator neural network 800 is illustrated as a CNN in FIG. 8, it can be other types of neural network, e.g., RNN or the like.

As depicted in FIG. 8, discriminator neural network 800 can include a plurality of blocks and sub-blocks. Each block or sub-block can include one or more layers. For example, discriminator neural network 800 can include, sequentially, blocks 803-805, concatenation (CONCAT) blocks 806a-806b, a difference block 807, and the like. Blocks 803-805 each can include a convolution (CONV) sub-block, a Leaky ReLU sub-block, a batch normalization (BN) sub-block, and the like. The convolution sub-blocks in blocks 803-805 can have different parameters. For example, the convolution sub-block in block 803 can perform a convolution operation with a convolution filter having a size of 7×7 (C7×7 as shown in FIG. 8), a convolution filter number of 64 (N64 as shown in FIG. 8), and a stride of 2 (S2 as shown in FIG. 8). Similarly, convolution sub-blocks in blocks 804 and 805 can have different convolution filter sizes, convolution filter numbers, and strides, as shown in FIG. 8. Blocks 803-805 can be connected to concatenation blocks 806a and 806b. Concatenation block 806a or 806b can concatenate the outputs from blocks 803-805. Difference block 807 can be connected to concatenation blocks 806a and 806b and configured to determine a difference between outputs from concatenation blocks 806a and 806b.

During execution, a segmentation result 801 (e.g. segmentation result 406 of FIG. 4 or segmentation result 711 of FIG. 7) and ground truth label maps 802 (e.g., ground truth label maps 408 of FIG. 4) can be input one by one into block 803 of discriminator neural network 800. Block 803 can perform a convolution operation with 64 convolution filters of 7×7 size and a stride of 2, apply a Leaky ReLu function, and perform a batch normalization. Outputs of block 803 can be provided to concatenation blocks 806a and 806b, as shown in FIG. 8. Similarly, segmentation result 801 and ground truth label maps 802 can also be input into blocks 804 and 805 for further processing, and the outputs from blocks 804 and 805 can be provided to concatenation blocks 806a and 806b. Concatenation block 806a or 806b can concatenate the outputs from blocks 803-805, and difference block 807 can determine a difference between concatenated outputs from concatenation blocks 806a and 806b and obtain the difference between segmentation result 801 and ground truth label maps 802. The determined difference can be used to train the compression neural network (e.g., compression neural network 4031 of FIG. 4 or compression neural network 500 of FIG. 5), the segmentation neural network (segmentation neural network 4051 of FIG. 4 or feature reconstruction network 600 of FIG. 6 and segmentor neural network 700 of FIG. 7) and discriminator neural network (discriminator network 4071 of FIG. 4 or discriminator neural network 800 of FIG. 8).

As shown in FIG. 4, compression neural network (C) 4031 can have a compression loss 403L, $loss_{cr}$, segmentation neural network (S) 4051 can have a segmentation loss 405L, $loss_{seg}$, and discriminator neural network (D) can have a discrimination loss 407L, $loss_{dis}$. Given a dataset with N training images $x_n$, and $y_n$ as the corresponding ground truth label maps, a multi-scale label feature loss ($loss_{dis}$) and segmentation loss ($loss_{seg}$) can be based on the following equations:

$$loss_{dis} = \qquad (Eq.\ 1)$$
$$-\min_{\theta_C,\theta_S}\max_{\theta_D}\zeta(\theta_C,\theta_S,\theta_D) = \frac{1}{N}\sum_{n=1}^{N}\ell_{mae}(\phi_D(\phi_S(\phi_C(x_n))),\phi_D(y_n))$$

$$loss_{seg} = \min_{\theta_C,\theta_S}\xi(\theta_C,\theta_S) + \ell_{mse}(\phi_S(\phi_C(x_n)), y_n) \qquad (Eq.\ 2)$$

where $\theta_C$, $\theta_S$, and $\theta_D$ are weight parameters of compression neural network C, segmentation neural network S, and discriminator neural network D, respectively. The $\ell_{mae}$ is the mean absolute error, $\phi_S(\phi_C(x_n))$ is the segmentation result of segmentation neural network S after input $x_n$ is compressed by compression neural network C, and $\phi_D(\cdot)$ represents the multi-scale hierarchical features extracted from each convolutional layer in discriminator neural network D. The $\ell_{mse}$ is the mean squared error (MSE) between predicted label from segmentation neural network S and ground truth label. $\Phi_C(\cdot)$, $\phi_S(\cdot)$ and $\phi_D(\cdot)$ represent the functionality of compression neural network C, segmentation neural network S, and discriminator neural network D, respectively. Thus, the loss for the discriminator can be based on the following equation:

$$-loss_{dis} = -\min_{\theta_C,\theta_S}\max_{\theta_D}\zeta(\theta_C,\theta_S,\theta_D) \qquad (Eq.\ 3)$$

This loss function $loss_{dis}$ can be set with a negative value to maximize the difference between the predicted label and the ground truth label. The reserved version of $loss_{dis}$ (positive value) to compression neural network C and segmentation neural network S, which can minimize such loss for the combined compression neural network C and segmentation neural network S. Therefore, the total loss for segmentation and compression neural networks can be based on the following equation:

$$loss_{total} = \qquad (Eq.\ 4)$$
$$-loss_{dis} + loss_{seg} = -\min_{\theta_C,\theta_S}\xi(\theta_C,\theta_S) + \min_{\theta_C,\theta_S}\max_{\theta_D}\zeta(\theta_C,\theta_S,\theta_D)$$

The compression loss ($loss_{cr}$) can be introduced to optimize the output of compression neural network C for achieving high compression rate. A function e can be used to estimate the number of bits for the representation after compression neural network C, e.g. entropy coding. Since this coding process is non-differentiable, a continuous differentiable Jensen's inequality can be adopted to estimate the upper bound of the number of required bits. This estimation can be used to train the compression neural network. Then the total loss for compression neural network C can be based on the following equation:

$$loss_{cr} + loss_{seg} + loss_{dis} = \qquad (Eq.\ 5)$$
$$\underbrace{\min(e(f(x_n)))}_{\#\ of\ bits} + \underbrace{\min_{\theta_C,\theta_S}\max_{\theta_D}\zeta(\theta_C,\theta_S,\theta_D)}_{Segmentation\ distortion} + \min_{\theta_C,\theta_S}\xi(\theta_C,\theta_S)$$

In some embodiments, training 440 can follow an alternating fashion. For each training epoch, the parameters of discriminator neural network D can be fixed, and compression neural network C and segmentation neural network S can be trained using the loss functions above, e.g., $loss_{total}$ (Eq. 4) for segmentation neural network S (e.g., reconstruction neural network g and segmentor neural network s), and $loss_{cr}$ (Eq. 5) for compression neural network C, to optimize the compression rate. A stochastic binarization algorithm can be applied to the compressed representation. Then, the parameters of compression neural network C and segmentation neural network S can be fixed, and discriminator neural network D can be trained by the gradients computed from its loss function ($loss_{dis}$). Therefore, neural network training 440 can gradually improve the segmentation results 406 of segmentation neural network 4051, as well as the compression efficiency of compression neural network 4031, after each epoch until reaching convergence.

Figure 9:
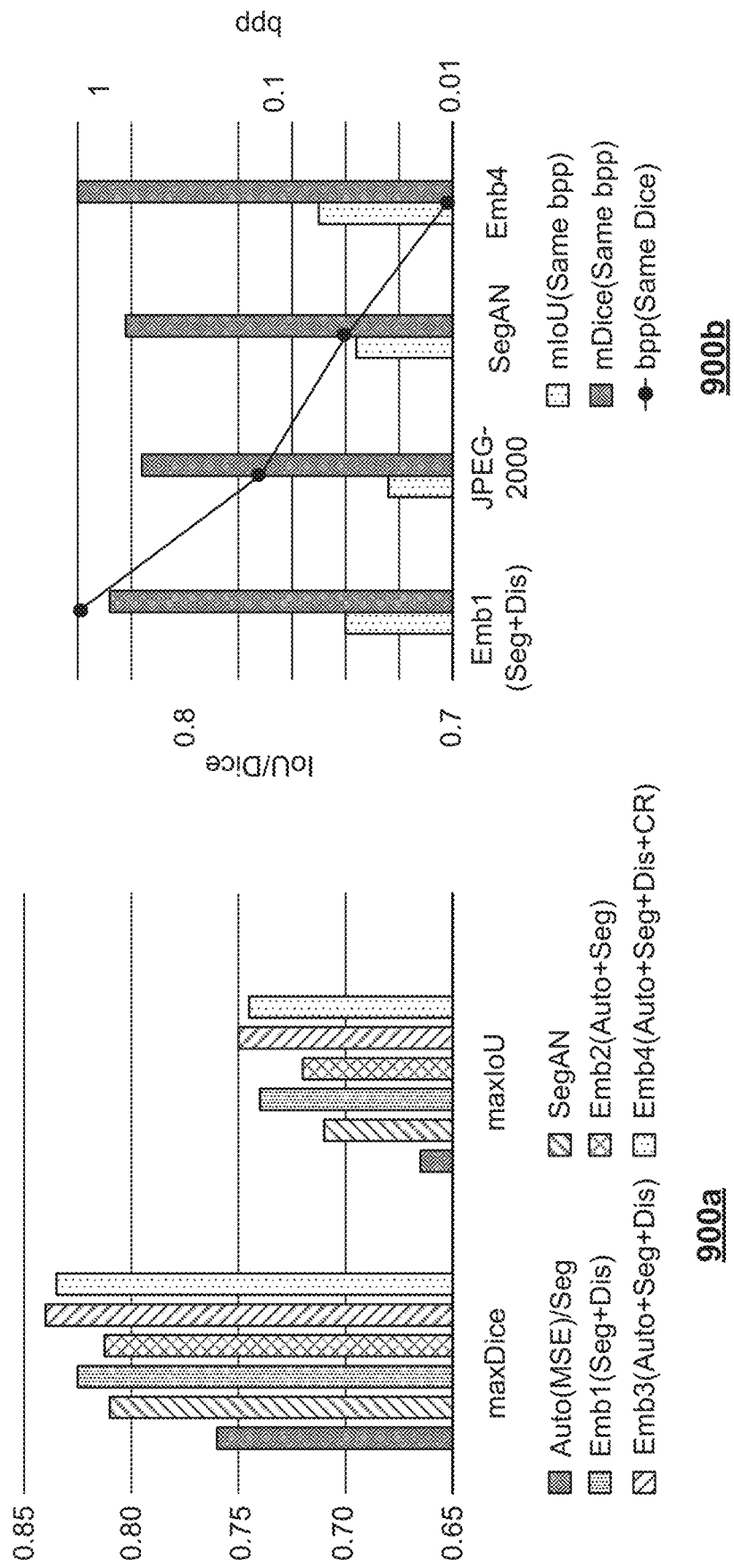
FIG. 9 is an exemplary diagram of segmentation results, according to some embodiments of the present disclosure.

In some embodiments, the aforementioned image processing 400 can be used in evaluating images of skin. For example, international skin imaging collaboration (ISIC) 2017 challenge dataset can be used to evaluate the 2D image segmentation. The challenge dataset provides 2000 training images, 150 validation images for the Lesion segmentation task. FIG. 9 illustrates an exemplary diagram of segmentation results of the ISIC 2017 challenge dataset, according to some embodiments of the present disclosure. Diagram 900a of FIG. 9 illustrates Dice (dice similarity coefficient)/IoU (intersection over union) score of 2D segmentation on some embodiments. A first embodiment (Emb1(Seg+Dis) as shown in FIG. 9) can include a segmentation neural network S and a discriminator neural network D. A second embodiment (Emb2(Auto+Seg) as shown in FIG. 9) can include a compression neural network C and a segmentation neural network S, but does not include a discriminator neural network D. A third embodiment (Emb3(Auto+Seg+Dis) as shown in FIG. 9) can include a compression neural network C, a segmentation neural network S, and a discriminator neural network D, but does not consider the compression loss. A fourth embodiment (Emb4(Auto+Seg+Dis+CR) as shown in FIG. 9) can include a compression neural network C, a segmentation neural network S, and a discriminator neural network D, and considers the compression loss. In addition, as comparison, auto encoder-based compression (Auto(MSE)/Seg as shown in FIG. 9) and a machine vision-based compression (SegAn as shown in FIG. 9) are also implemented. As shown in diagram 900a, embodiments of present disclosure can improve the segmentation performance after image compression. In particular, the first embodiment Emb1(Seg+Dis) can achieve higher score over SegAN, indicating that the predict-oriented discriminator can improve the segmentation accuracy with the combination of $loss_{seg}$ and $loss_{dis}$ over the baseline adversarial segmentation network on uncompressed images. With the consideration of compression, the third embodiment Emb3 (Auto+Seg+Dis) and the fourth embodiment Emb4(Auto+ Seg+Dis+CR) show better Dice and IoU. This indicates that the joint training (e.g., training 440 of FIG. 4) can learn as many features as possible with the compression neural network, segmentation neural network and discriminator neural network. Auto(MSE)/Seg that is designed under the guidance of human visual quality loss (e.g. MSE), achieves the lowest Dice/IoU among all shown designs.

Diagram 900b of FIG. 9 illustrates the average bpp (bits per pixel) of some compression approaches, e.g, the first embodiment Emb1(Seg+Dis), the fourth embodiments Emb4(Auto+Seg+Dis+CR), JPEG-2000, and SegAN, as well as their Dice and IoU. The fourth embodiments Emb4 (Auto+Seg+Dis+CR) that can be trained with additional compression loss $loss_{cr}$ can provide the best average bpp of 0.012 that improves the image compression rate by almost two orders of magnitude than that of uncompressed images (average bpp of 1.24), by one order of magnitude than that of JPEG-2000 (average bpp of 0.12) and >3 times than that of the SegAN (average bpp of 0.04).

In some embodiments of the present disclosure, for 3D image segmentation, the HVSMR (Whole-Heart and Great Vessel Segmentation from 3D Cardiovascular MRI in Congenital Heart Disease) 2016 challenge dataset can be used. The challenge dataset includes 5 3D cardiovascular magnetic resonance (CMR) images for training and 5 scans for testing. Each image includes three segmentation labels: myocardium, blood pool and background. The original images are randomly cropped to many smaller pieces of data to facilitate training and overcome the overfitting. FIG. 10 illustrates a Table 1000 of exemplary segmentation results on HVSMR 2016 challenge dataset, according to some embodiments of the present disclosure. As shown in Table 1000, 3D CMR images (Img. in Table 1000) are tested with segmentation targeting "Myocardium" and "Blood Pool", and the Dice and IoU scores are compared among the uncompressed design (Uncomp. in Table 1000), SegAN (SA in Table 1000), and an embodiment (Emb in Table 1000) of the present disclosure. The compression rate is kept at the same level as ours (bpp=0.014). Compared with the uncompressed image segmentation, the embodiment Emb can improve the average Dice/IoU score by 0.002/0.003 and 0.002/0.002 on "Myocardium" and "Blood Pool", respectively. Moreover, compared with SegAN, the embodiment can also demonstrate an improvement on Dice/IoU score. Table 1000 can indicate that the embodiment Emb can achieve high segmentation accuracy at a high compression rate for 3D images.

FIG. 11 illustrates a Table 1100 of exemplary latency to process a 3D CT image of size 300 MB, according to some embodiments of the present disclosure. The computation latency at remote for reconstruction (Recon in Table 1100) and segmentation (Seg in Table 1100) is evaluated by Nvidia GeForce GTX 1080 GPUs, while the image compression runs on an Intel Core i7-6850 CPU to emulate a resource-constraint local computing device. As shown in Table 1100, an embodiment (Emb in Table 1100) can take total latency of 0.26 s, which achieves 5.7× and 2.4× speedup over the JPEG-based design and SegAN, respectively. The data transmission (Trans in Table 1100) time dominates the total service latency. The embodiment of the present disclosure can improve the compression rate and reduce compression overhead.

Figure 12:
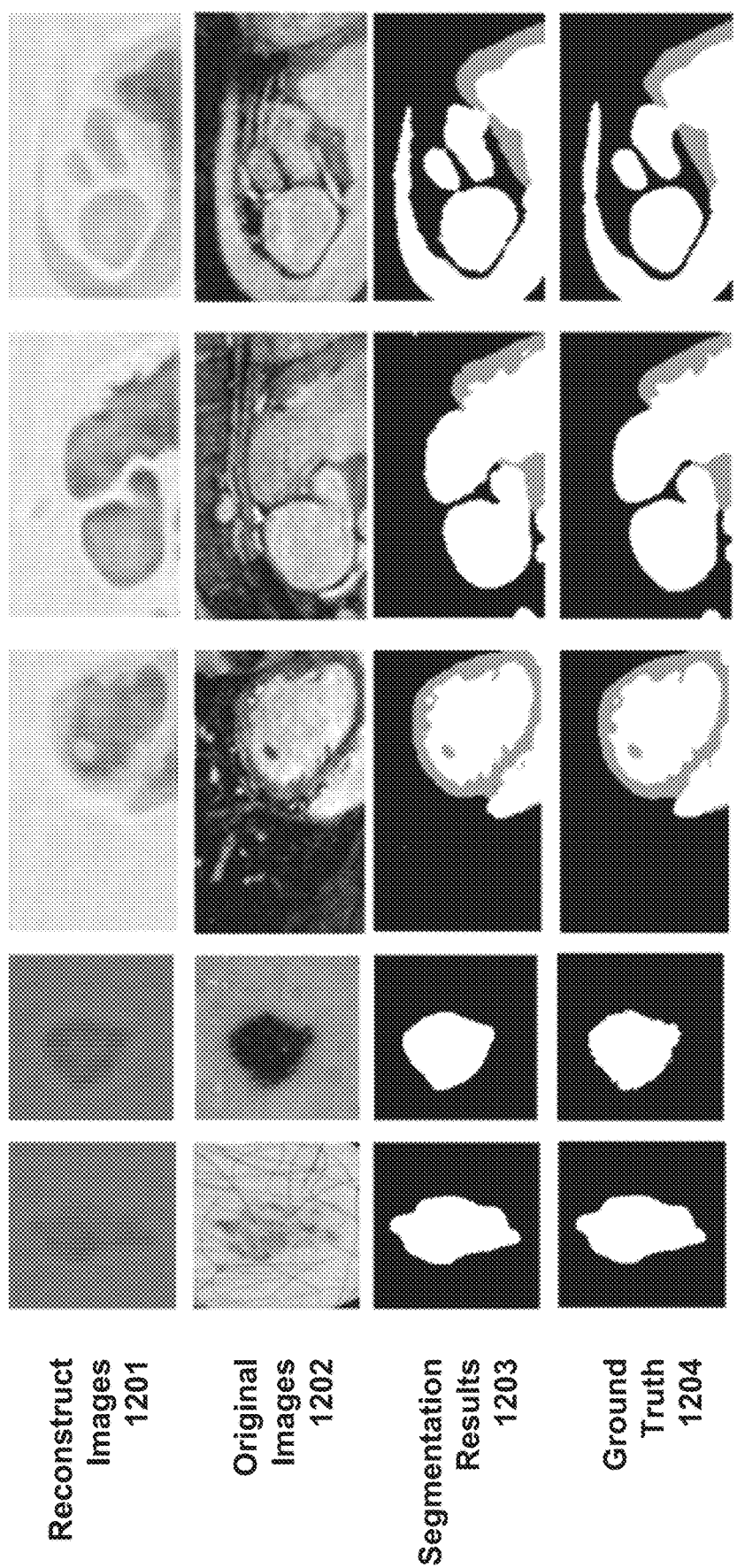
FIG. 12 illustrates exemplary comparisons between original images and processing results, according to some embodiments of the present disclosure.

FIG. 12 illustrates exemplary comparisons between original images and processing results, according to some embodiments of the present disclosure. As shown in FIG. 12, the first to fourth rows shows the reconstructed images (e.g., feature maps) 1201, original images 1202, segmentation results 1203, and ground truth 1204, respectively. The reconstructed images 1201 represents the visualization results from feature reconstruction neural network (e.g., feature reconstruction neural network 600 of FIG. 6) before feeding into a segmentor neural network. Compared with original images 1202, the reconstructed feature maps can preserve limited visual quality for human vision, but provide a high quality of segmentation. The original images with RGB channels or with an intensity channel may not be optimal, and some undesired features can be removed. For example, hairs in the original image of the first column can be eliminated, which can actually make the segmentations more accurate. Moreover, as shown in FIG. 12, the reconstructed feature maps 1201 from both 2D or 3D images are formed by many small blocks with the similar patterns and such patterns can further improve compression rate.

Figure 13:
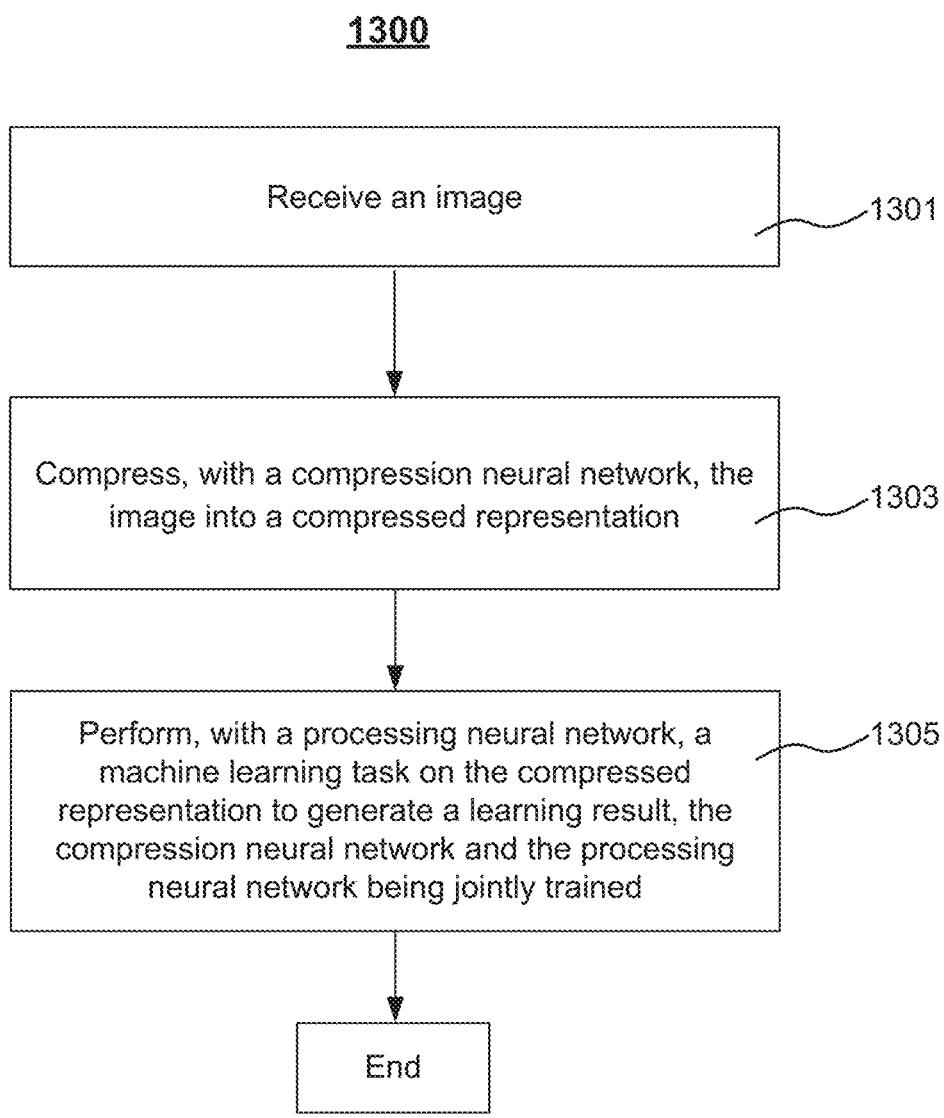
FIG. 13 is a flowchart of an exemplary image processing method, according to some embodiments of the present disclosure.

FIG. 13 is a flowchart of an exemplary image processing method 1300, according to some embodiments of the present disclosure. Image processing method 1300 can be implemented, at least partially, by neural network accelerator 200 of FIGS. 2A and 2C, core 202 of FIGS. 2A-2B, cloud system 230 of FIG. 2C, image processing 400 of FIG. 4, compression neural network 500 of FIG. 5, feature reconstruction network 600 of FIG. 6, segmentor neural network 700 of FIG. 7, or discriminator neural network 800 of FIG. 8. Moreover, image processing method 1300 can also be implemented by a computer program product, embodied in a computer-readable medium, including computer-executable instructions, such as program code, executed by computers. In some embodiments, a host unit (e.g., host unit 220 of FIG. 2A or 2C) may compile software code for generating instructions for providing to one or more accelerators to perform image processing method 1300.

As shown in FIG. 13, at step 1301, image processing method 1300 can include receiving an image (e.g., image 401 of FIG. 4). For example, the image can be obtained at a local site (e.g., local site 410 of FIG. 4) and stored in a memory or a storage (e.g., an image container 402 of FIG. 4). In some embodiments, the image can be a medical image, e.g., medical 2D or 3D CT image.

At step 1303, image processing method 1300 can include compressing, with a compression neural network (e.g., compression neural network 4031 of FIG. 4 or compression neural network 500 of FIG. 5), the image into a compressed representation (e.g., compressed representation 404 of FIG. 4 or compressed representation 505 of FIG. 5).

At step 1305, image processing method 1300 can include performing, with a processing neural network (e.g., processing neural network 4051 of FIG. 4), a machine learning task on the compressed representation to generate a learning result. The compression neural network and the processing neural network can be jointly trained (e.g., according to Eq. 1-Eq. 5). The processing neural network comprising at least one of a segmentation neural network (e.g., segmentation neural network 4015 of FIG. 4 or segmentor neural network 700 of FIG. 7), a recognition neural network, a classification neural network, an object detection neural network. In some embodiments, image processing method 1300 can also include performing, with a feature reconstruction neural network (e.g., feature reconstruction network 600 of FIG. 6), a reconstruction on the compressed representation to generate a reconstructed representation. Moreover, image processing method 1300 can include performing, with a segmentor neural network (e.g., segmentor neural network 700 of FIG. 7), a segmentation task on reconstructed representation to generate a segmentation result.

In some embodiments, image processing method 1300 can include receiving, with a discriminator neural network (e.g., discriminator neural network 4071 of FIG. 4 or discriminator neural network 800 of FIG. 8), the learning result (e.g., segmentation result 406 of FIG. 4 or segmentation result 801 of FIG. 8) and a ground truth (e.g., ground truth 408 of FIG. 4 or ground truth 802 of FIG. 8) and performing, with the discriminator neural network, a discrimination on the learning result and a ground truth. Image processing method 1300 can also include jointly training the compression neural network and the processing neural network using a result of the discrimination (e.g., according to Eq. 1-Eq. 5).

In some embodiments, image processing method 1300 can include transmitting the compressed representation from a local site (e.g., local site 410 of FIG. 4) to the processing neural network at a remote site (e.g., remote site 420 of FIG. 4). Image processing method 1300 can also include transmitting the learning result from the remote site back to the local site.

It is appreciated that the embodiments disclosed herein can be used in various application environments, such as artificial intelligence (AI) training and inference, database and big data analytic acceleration, video compression and decompression, and the like.

Embodiments of the present disclosure can be applied to many products. For example, some embodiments of the present disclosure can be applied to Ali-NPU (e.g., Hanguang NPU), Ali-Cloud, Ali PIM-AI (Processor-in Memory for AI), Ali-DPU (Database Acceleration Unit), Ali-AI platform, Ali-Data Center AI Inference Chip, IoT Edge AI Chip, GPU, TPU, or the like.

The embodiments may further be described using the following clauses:

1. An image processing method, comprising:
   receiving an image;
   compressing, with a compression neural network, the image into a compressed representation; and
   performing, with a processing neural network, a machine learning task on the compressed representation to generate a learning result,
   wherein the compression neural network and the processing neural network are jointly trained.

2. The method of clause 1, wherein performing, with the processing neural network, the machine learning task on the compressed representation comprises:
   performing, with a feature reconstruction neural network, a reconstruction on the compressed representation to generate a reconstructed representation.

3. The method of clause 2, wherein performing, with the processing neural network, the machine learning task on the compressed representation comprises:
   performing, with a segmentor neural network, a segmentation task on the reconstructed representation to generate a segmentation result.

4. The method of any one of clauses 1-3, further comprising:
   receiving, with a discriminator neural network, the learning result and a ground truth; and
   performing, with the discriminator neural network, a discrimination on the learning result and a ground truth.

5. The method of clause 4, further comprising:
   jointly training the compression neural network and the processing neural network using a result of the discrimination.

6. The method of clause 5, further comprising:
   jointly training the compression neural network and the processing neural network using a plurality of training images and corresponding ground truth label maps based on a compression loss function, a segmentation loss function and a discrimination loss function.

7. The method of any one of clauses 1-6, further comprising:
   transmitting the compressed representation from a local site to the processing neural network at a remote site.

8. The method of clause 7, further comprising:
   transmitting the learning result from the remote site back to the local site.

9. The method of any one of clauses 1-8, wherein the processing neural network comprising at least one of a segmentation neural network, a recognition neural network, a classification neural network, or an object detection neural network.

10. An image processing system, comprising:
    at least one memory for storing instructions; and
    at least one processor configured to execute the instructions to cause the system to perform:
    receiving an image;
    compressing, with a compression neural network, the image into a compressed representation; and
    performing, with a processing neural network, a machine learning task on the compressed representation to generate a learning result,
    wherein the compression neural network and the processing neural network are jointly trained.

11. The system of clause 10, wherein the at least one processor is configured to execute the instructions to cause the system to perform:
    performing, with a feature reconstruction neural network, a reconstruction on the compressed representation to generate a reconstructed representation.

12. The system of clause 11, wherein the at least one processor is configured to execute the instructions to cause the system to perform:
    performing, with a segmentor neural network, a segmentation task on the reconstructed representation to generate a segmentation result.

13. The system of any one of clauses 10-12, wherein the at least one processor is configured to execute the instructions to cause the system to perform:
receiving, with a discriminator neural network, the learning result and a ground truth; and
performing, with the discriminator neural network, a discrimination on the learning result and a ground truth.
14. The system of clause 13, wherein the at least one processor is configured to execute the instructions to cause the system to perform:
jointly training the compression neural network and the processing neural network using a result of the discrimination.
15. The system of clause 14, wherein the at least one processor is configured to execute the instructions to cause the system to perform:
jointly training the compression neural network and the processing neural network using a plurality of training images and corresponding ground truth label maps based on a compression loss function, a segmentation loss function and a discrimination loss function.
16. The system of any one of clauses 10-15, wherein the at least one processor is configured to execute the instructions to cause the system to perform:
transmitting the compressed representation from a local site to the processing neural network at a remote site.
17. The system of clause 16, wherein the at least one processor is configured to execute the instructions to cause the system to perform:
transmitting the learning result from the remote site back to the local site.
18. The system of any one of clauses 10-17, wherein the processing neural network comprising at least one of a segmentation neural network, a recognition neural network, a classification neural network, or an object detection neural network.
19. A non-transitory computer readable storage medium storing a set of instructions that are executable by one or more processing devices to cause an image processing system to perform:
receiving an image;
compressing, with a compression neural network, the image into a compressed representation; and
performing, with a processing neural network, a machine learning task on the compressed representation to generate a learning result,
wherein the compression neural network and the processing neural network are jointly trained.
20. The non-transitory computer readable storage medium of clause 19, wherein the set of instructions are executable by the one or more processing devices to cause the image processing system to perform:
performing, with a feature reconstruction neural network, a reconstruction on the compressed representation to generate a reconstructed representation.
21. The non-transitory computer readable storage medium of clause 20, wherein the set of instructions are executable by the one or more processing devices to cause the image processing system to perform:
performing, with a segmentor neural network, a segmentation task on the reconstructed representation to generate a segmentation result.
22. The non-transitory computer readable storage medium of any one of clauses 19-21, wherein the set of instructions are executable by the one or more processing devices to cause the image processing system to perform:
receiving, with a discriminator neural network, the learning result and a ground truth; and
performing, with the discriminator neural network, a discrimination on the learning result and a ground truth.
23. The non-transitory computer readable storage medium of clause 22, wherein the set of instructions are executable by the one or more processing devices to cause the image processing system to perform:
jointly training the compression neural network and the processing neural network using a result of the discrimination.
24. The non-transitory computer readable storage medium of clause 23, wherein the set of instructions are executable by the one or more processing devices to cause the image processing system to perform:
jointly training the compression neural network and the processing neural network using a plurality of training images and corresponding ground truth label maps based on a compression loss function, a segmentation loss function and a discrimination loss function.
25. The non-transitory computer readable storage medium of any one of clauses 19-24, wherein the set of instructions are executable by the one or more processing devices to cause the image processing system to perform:
transmitting the compressed representation from a local site to the processing neural network at a remote site.
26. The non-transitory computer readable storage medium of clause 25, wherein the set of instructions are executable by the one or more processing devices to cause the image processing system to perform:
transmitting the learning result from the remote site back to the local site.
27. The non-transitory computer readable storage medium of any one of clauses 19-26, wherein the processing neural network comprising at least one of a segmentation neural network, a recognition neural network, a classification neural network, or an object detection neural network.

The various example embodiments described herein are described in the general context of method steps or processes, which may be implemented in one aspect by a computer program product, embodied in a computer readable medium, including computer-executable instructions, such as program code, executed by computers in networked environments. A computer readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the present disclosure are apparent from the detailed specification, and thus, it is intended that the appended claims cover all systems and methods falling within the true spirit and scope of the present disclosure. As used herein, the indefinite articles "a" and "an" mean "one or more." Further, since numerous modifications and variances will readily occur from studying the present disclosure, it is not desired to limit the present disclosure to the exact reconstruction and operation illustrated and described, and accordingly, all suitable modifications and equivalents may be resorted to, falling within the scope of the present disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An image processing method, comprising:
   receiving an image;
   compressing, with a compression neural network, the image into a compressed representation; and
   performing, with a processing neural network, a machine learning task on the compressed representation to generate a learning result,
   wherein the compression neural network and the processing neural network are jointly trained.

2. The method of claim 1, wherein performing, with the processing neural network, the machine learning task on the compressed representation comprises:
   performing, with a feature reconstruction neural network, a reconstruction on the compressed representation to generate a reconstructed representation.

3. The method of claim 2, wherein performing, with the processing neural network, the machine learning task on the compressed representation comprises:
   performing, with a segmentor neural network, a segmentation task on the reconstructed representation to generate a segmentation result.

4. The method of claim 1, further comprising:
   receiving, with a discriminator neural network, the learning result and a ground truth; and
   performing, with the discriminator neural network, a discrimination on the learning result and a ground truth.

5. The method of claim 4, further comprising:
   jointly training the compression neural network and the processing neural network using a result of the discrimination.

6. The method of claim 5, further comprising:
   jointly training the compression neural network and the processing neural network using a plurality of training images and corresponding ground truth label maps based on a compression loss function, a segmentation loss function and a discrimination loss function.

7. The method of claim 1, further comprising:
   transmitting the compressed representation from a local site to the processing neural network at a remote site.

8. The method of claim 1, wherein the processing neural network comprising at least one of a segmentation neural network, a recognition neural network, a classification neural network, or an object detection neural network.

9. An image processing system, comprising:
   at least one memory for storing instructions; and
   at least one processor configured to execute the instructions to cause the system to perform:
   receiving an image;
   compressing, with a compression neural network, the image into a compressed representation; and
   performing, with a processing neural network, a machine learning task on the compressed representation to generate a learning result,
   wherein the compression neural network and the processing neural network are jointly trained.

10. The system of claim 9, wherein the at least one processor is configured to execute the instructions to cause the system to perform:
    performing, with a feature reconstruction neural network, a reconstruction on the compressed representation to generate a reconstructed representation.

11. The system of claim 10, wherein the at least one processor is configured to execute the instructions to cause the system to perform:
    performing, with a segmentor neural network, a segmentation task on the reconstructed representation to generate a segmentation result.

12. The system of claim 9, wherein the at least one processor is configured to execute the instructions to cause the system to perform:
    receiving, with a discriminator neural network, the learning result and a ground truth; and
    performing, with the discriminator neural network, a discrimination on the learning result and a ground truth.

13. The system of claim 12, wherein the at least one processor is configured to execute the instructions to cause the system to perform:
    jointly training the compression neural network and the processing neural network using a plurality of training images and corresponding ground truth label maps based on a compression loss function, a segmentation loss function and a discrimination loss function.

14. The system of claim 9, wherein the processing neural network comprising at least one of a segmentation neural network, a recognition neural network, a classification neural network, or an object detection neural network.

15. A non-transitory computer readable storage medium storing a set of instructions that are executable by one or more processing devices to cause an image processing system to perform:
   receiving an image;
   compressing, with a compression neural network, the image into a compressed representation; and
   performing, with a processing neural network, a machine learning task on the compressed representation to generate a learning result,
   wherein the compression neural network and the processing neural network are jointly trained.

16. The non-transitory computer readable storage medium of claim 15, wherein the set of instructions are executable by the one or more processing devices to cause the image processing system to perform:
   performing, with a feature reconstruction neural network, a reconstruction on the compressed representation to generate a reconstructed representation.

17. The non-transitory computer readable storage medium of claim 16, wherein the set of instructions are executable by the one or more processing devices to cause the image processing system to perform:
   performing, with a segmentor neural network, a segmentation task on the reconstructed representation to generate a segmentation result.

18. The non-transitory computer readable storage medium of claim 15, wherein the set of instructions are executable by the one or more processing devices to cause the image processing system to perform:
   receiving, with a discriminator neural network, the learning result and a ground truth; and
   performing, with the discriminator neural network, a discrimination on the learning result and a ground truth.

19. The non-transitory computer readable storage medium of claim 18, wherein the set of instructions are executable by the one or more processing devices to cause the image processing system to perform:
   jointly training the compression neural network and the processing neural network using a plurality of training images and corresponding ground truth label maps based on a compression loss function, a segmentation loss function and a discrimination loss function.

20. The non-transitory computer readable storage medium of claim 15, wherein the processing neural network comprising at least one of a segmentation neural network, a recognition neural network, a classification neural network, or an object detection neural network.

* * * * *